(12) United States Patent
Gurelli et al.

(10) Patent No.: US 12,457,031 B2
(45) Date of Patent: Oct. 28, 2025

(54) AD HOC INTELLIGENT REFLECTING SURFACE

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Tao Luo, San Diego, CA (US); Navid Abedini, Basking Ridge, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

(21) Appl. No.: 17/650,321

(22) Filed: Feb. 8, 2022

(65) Prior Publication Data

US 2023/0254031 A1 Aug. 10, 2023

(51) Int. Cl.
*H04B 7/145* (2006.01)
*H04W 16/28* (2009.01)

(52) U.S. Cl.
CPC ............ *H04B 7/145* (2013.01); *H04W 16/28* (2013.01)

(58) Field of Classification Search
CPC .. H04B 7/145; H04B 7/04013; H04B 7/0617; H04B 7/15528; H04B 7/0695; H04B 7/0408; H04B 10/40; H04B 7/2612; H04B 10/1149; H04B 7/024; H04W 16/28; H04W 8/14; H04W 4/80; H04W 48/18; H04W 84/18; H04W 4/33; H04W 64/00; H04W 72/21; H04W 72/51; H04W 74/004; H04W 92/18; H04W 28/0205; H04W 8/24; H04W 72/02; H04W 72/231; H04W 72/121; H04W 88/04; H04W 88/02; H04W 76/20; H04W 76/15; H01Q 3/46; H01Q 15/147; H01Q 15/18; H01Q 3/36; H01Q 21/0087; H01Q 23/00; H01Q 21/24; H01Q 25/00
See application file for complete search history.

(56) References Cited

U.S. PATENT DOCUMENTS

| | | | | |
|---|---|---|---|---|
| 11,546,022 | B2 * | 1/2023 | Dunna | H01Q 15/147 |
| 2019/0199379 | A1 * | 6/2019 | Osterling | H04B 7/0617 |
| 2021/0013619 | A1 * | 1/2021 | Alkhateeb | H04B 7/04013 |
| 2022/0014935 | A1 * | 1/2022 | Haija | H04W 16/28 |
| 2022/0377730 | A1 * | 11/2022 | Yang | H04B 7/040 |
| 2023/0163822 | A1 * | 5/2023 | Huang | H04B 7/0695 |
| 2023/0180020 | A1 * | 6/2023 | Gurelli | H04W 16/28 |
| 2024/0007176 | A1 * | 1/2024 | Jeong | |
| 2024/0204837 | A1 * | 6/2024 | Wu | H04B 7/0617 |
| 2024/0214847 | A1 * | 6/2024 | Elshafie | H04W 76/15 |
| 2024/0250743 | A1 * | 7/2024 | Yapici | H04B 7/145 |
| 2024/0380437 | A1 * | 11/2024 | Prasad | H04B 7/04013 |

* cited by examiner

*Primary Examiner* — Lana N Le
(74) *Attorney, Agent, or Firm* — Patterson & Sheridan LLP

(57) ABSTRACT

Certain aspects of the present disclosure provide techniques for communicating with an ad hoc intelligent reflecting surface (IRS). A method that may be performed by a user equipment includes receiving signals from a network entity via an ad hoc IRS; configuring the IRS for communications between the UE and the network entity based at least in part on the received signals; and communicating with the network entity through the IRS.

17 Claims, 15 Drawing Sheets

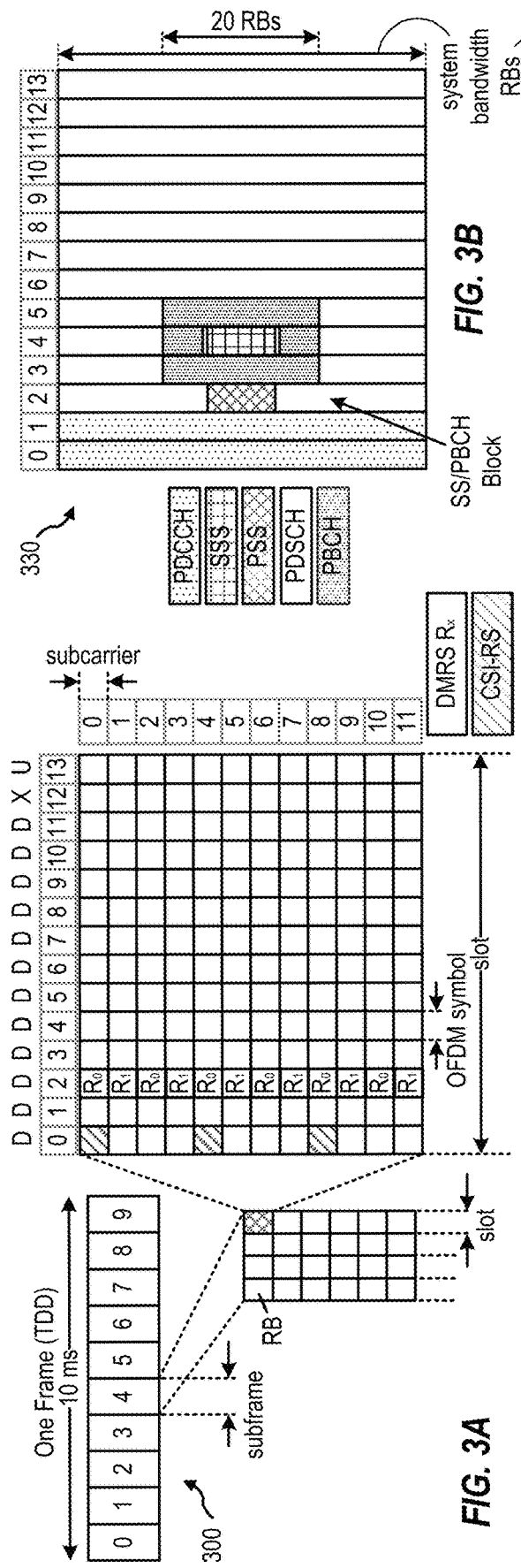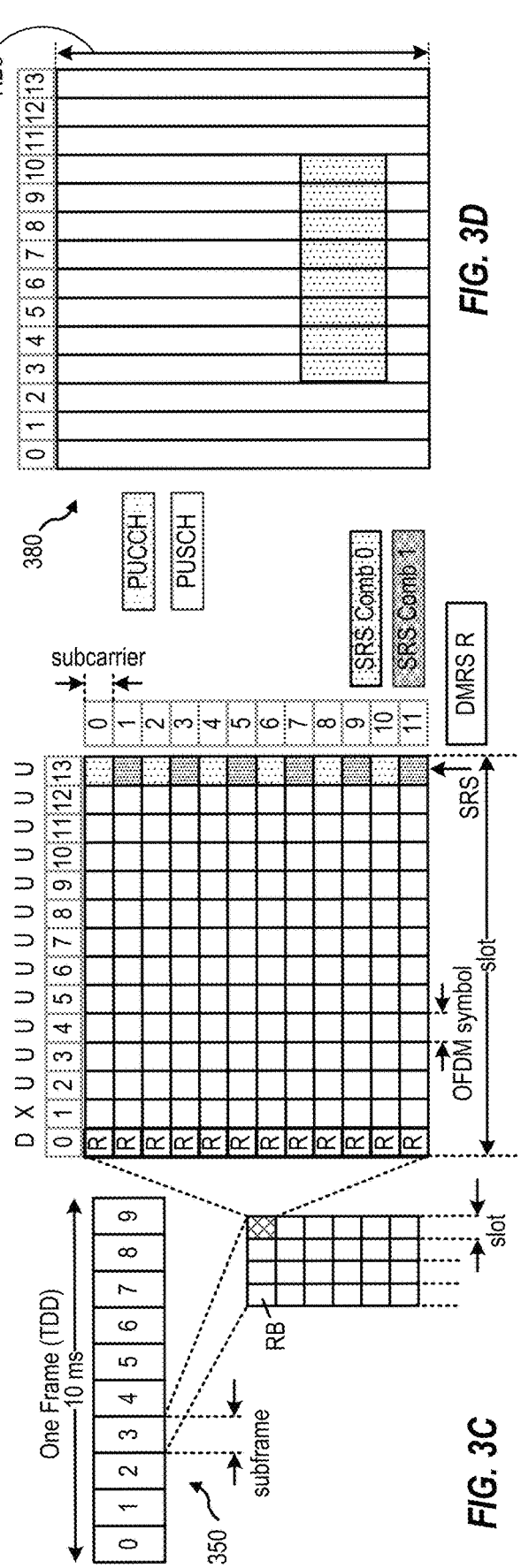

AD HOC INTELLIGENT REFLECTING SURFACE

BACKGROUND

Aspects of the present disclosure relate to wireless communications, and more particularly, to techniques for wirelessly communicating with an intelligent reflecting surface.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved wireless communication performance with an ad hoc intelligent reflecting surface.

Certain aspects of the subject matter described in this disclosure can be implemented in a method for wireless communication by a user equipment (UE). The method generally includes receiving signals from a network entity via an ad hoc intelligent reflecting surface (IRS); configuring the IRS for communications between the UE and the network entity based at least in part on the received signals; and communicating with the network entity through the IRS.

Certain aspects of the subject matter described in this disclosure can be implemented in a method for wireless communication by a controller. The method generally includes reflecting signals from a network entity to a user equipment (UE) with an ad hoc intelligent reflecting surface (IRS); receiving, from the UE, a configuration associated with communications between the UE and the network entity via the IRS; and reflecting communications between the network entity and the UE with the IRS based on the configuration.

Certain aspects of the subject matter described in this disclosure can be implemented in a UE for wireless communication. The UE generally includes a memory and a processor coupled to the memory. The processor is configured to: receive signals from a network entity via an ad hoc intelligent reflecting surface (IRS), configure the IRS for communications between the UE and the network entity based at least in part on the received signals, and communicate with the network entity through the IRS.

Certain aspects of the subject matter described in this disclosure can be implemented in an apparatus for wireless communication. The apparatus generally includes a memory; and a processor coupled to the memory, the processor being configured to: reflect signals from a network entity to a user equipment (UE) with an ad hoc intelligent reflecting surface (IRS), receive, from the UE, a configuration associated with communications between the UE and the network entity via the IRS, and reflect communications between the network entity and the UE with the IRS based on the configuration.

Certain aspects of the subject matter described in this disclosure can be implemented in a UE for wireless communication. The UE generally includes means for receiving signals from a network entity via an ad hoc intelligent reflecting surface (IRS); means for configuring the IRS for communications between the UE and the network entity based at least in part on the received signals; and means for communicating with the network entity through the IRS.

Certain aspects of the subject matter described in this disclosure can be implemented in an apparatus for wireless communication. The apparatus generally includes means for reflecting signals from a network entity to a user equipment (UE) with an ad hoc intelligent reflecting surface (IRS); means for receiving, from the UE, a configuration associated with communications between the UE and the network entity via the IRS; and means for reflecting communications between the network entity and the UE with the IRS based on the configuration.

Certain aspects of the subject matter described in this disclosure can be implemented in a computer-readable medium. The computer-readable medium has instructions stored thereon, that when executed by a UE, cause the apparatus to perform operations including receiving signals from a network entity via an ad hoc intelligent reflecting surface (IRS); configuring the IRS for communications between the UE and the network entity based at least in part on the received signals; and communicating with the network entity through the IRS.

Certain aspects of the subject matter described in this disclosure can be implemented in a computer-readable medium. The computer-readable medium has instructions stored thereon, that when executed by an apparatus, cause the apparatus to perform operations including reflecting signals from a network entity to a user equipment (UE) with an ad hoc intelligent reflecting surface (IRS); receiving, from the UE, a configuration associated with communications between the UE and the network entity via the IRS; and reflecting communications between the network entity and the UE with the IRS based on the configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatuses, methods, processing systems, and computer-readable mediums for communicating with an ad hoc intelligent reflecting surface (IRS).

In certain cases, a blockage may be located between a wireless device and another wireless device that degrades the wireless communication performance between the wireless devices. For example, a base station may be located outside, and a user equipment may be located inside a structure, such as an office building, a house, an apartment, etc. Signals communicated between the base station and user equipment may encounter a path loss due to the structure. In some cases, a wireless communication device may have a limited link budget for wireless communications, for example, in a non-terrestrial network.

Aspects of the present disclosure provide techniques and apparatus for communicating with an ad hoc IRS. An ad hoc IRS may be a portable device that can be temporarily deployed by a user in a wireless communication network, where the position and orientation of the IRS may change at will. The ad hoc IRS may be foldable like a map or capable of being rolled like a mat to facilitate portability. A UE may be paired with an ad hoc IRS and control the operation of the ad hoc IRS. For example, the UE may configure the IRS to beamform or focus transmissions from a base station to the UE and/or beamform or focus transmission from the UE to the base station. In certain aspects, the network may be unaware of the ad hoc IRS, such that a UE paired with the IRS may be the only device that can configure the IRS. The network may not store any information related to the IRS.

The techniques and apparatus for communicating with an ad hoc IRS described herein may enable improved wireless communication performance, such as reduced latencies and/or increased throughput, for example, due to the ad hoc IRS providing a higher gain compared to a user equipment and/or due to the ad hoc IRS enabling communications around a blockage as further described herein.

Introduction to Wireless Communication Networks

Figure 1:
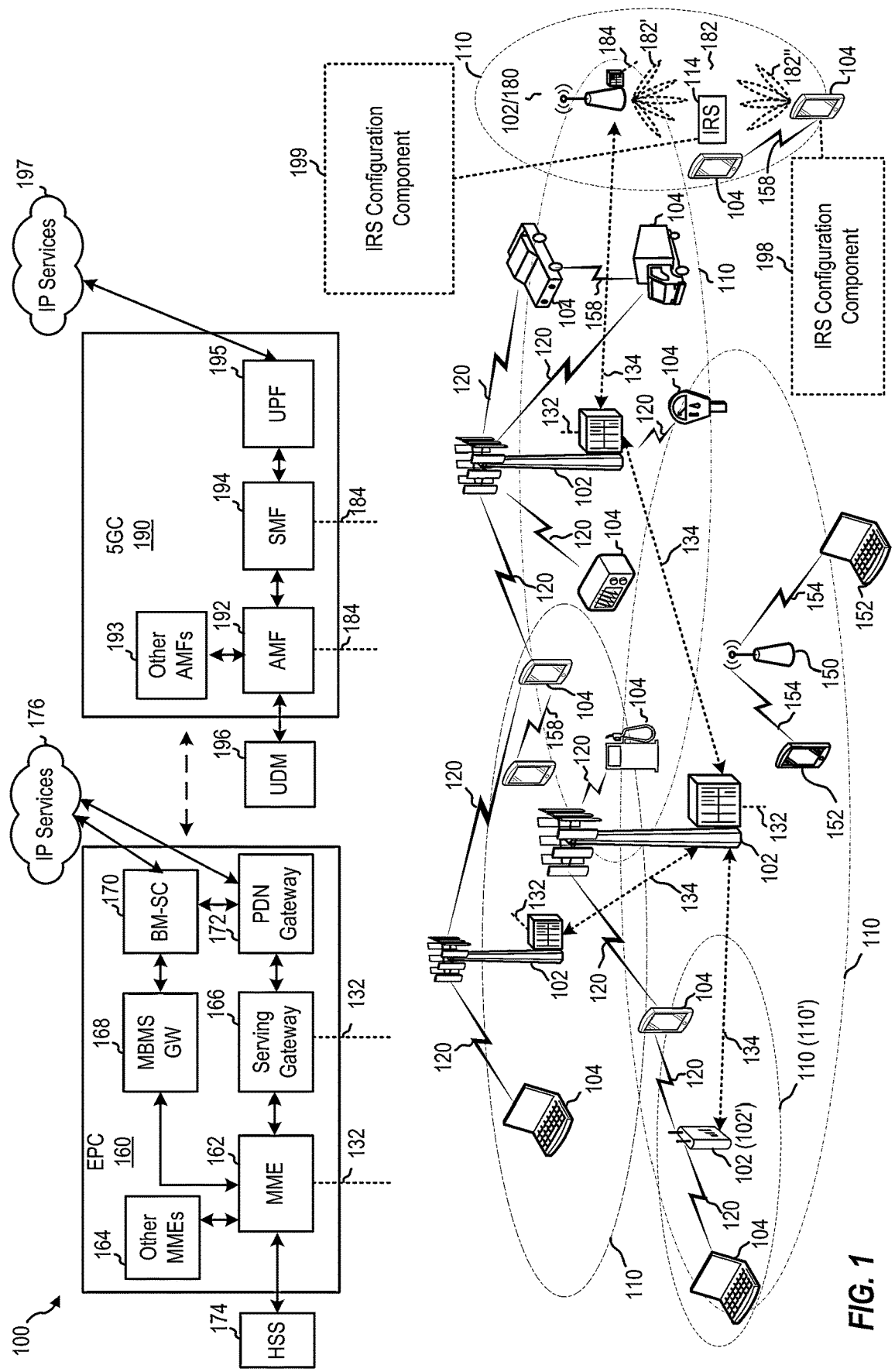
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipment (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

In certain aspects, the base station 102 and user equipment 104 may communicate through an intelligent reflecting surface (IRS) 114, for example, when a line-of-sight path between the base station 102 and the user equipment 104 is obstructed by an obstacle or when the channel capacity or channel quality in the line-of-sight path is relatively low. In certain cases, multiple user equipment 104 may communicate with each other through the IRS 114. The IRS 114 may serve as a reflector for wireless communications. The IRS 114 may use a codebook for precoding one or more elements (e.g., antenna elements or meta-surface elements) thereon (referred to as reflection elements) to allow a beam from the base station 102 (e.g., a transmitter) to be re-radiated off the IRS 114 to reach the user equipment 104 (e.g., a receiver), or vice versa. A reflection controller (as further described herein with respect to FIG. 2) may control or reconfigure the spatial direction of the re-radiation (e.g., the beamforming) at the IRS 114. The term "intelligent reflecting surface" can refer to any suitable reconfigurable reflecting device in a range of reflecting devices, such as a reconfigurable intelligent surface (RIS), reflectarray, meta-surface, etc.

Wireless communication network 100 includes an IRS configuration component 199, which may configure an ad hoc IRS for communications between a base station and a user equipment. Wireless network 100 further includes an IRS configuration component 198, which may determine a configuration for an ad hoc IRS and configure the ad hoc IRS for communications between a base station and a user equipment.

Figure 2:
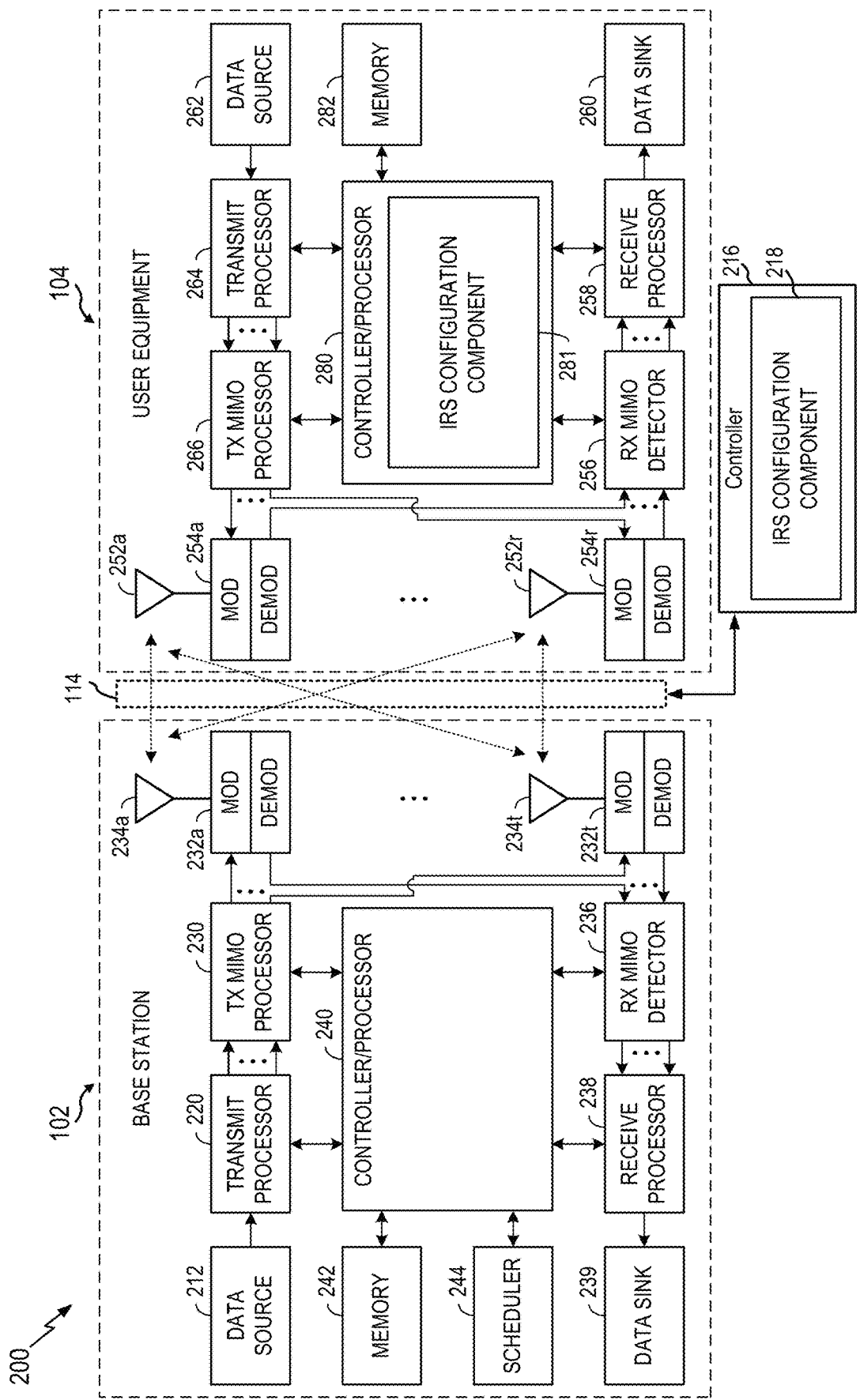
FIG. 2 is a block diagram conceptually illustrating aspects of an example of a base station and user equipment (UE).

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104. Base station 102 includes controller/processor 240, which may be configured to implement various functions related to wireless communications.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes an IRS configuration component 281, which may be representative of the IRS configuration component 198 of FIG. 1. Notably, while depicted as an aspect of controller/processor 280, the IRS configuration component 281 may be implemented additionally or alternatively in various other aspects of user equipment 104 in other implementations.

Figure 5:
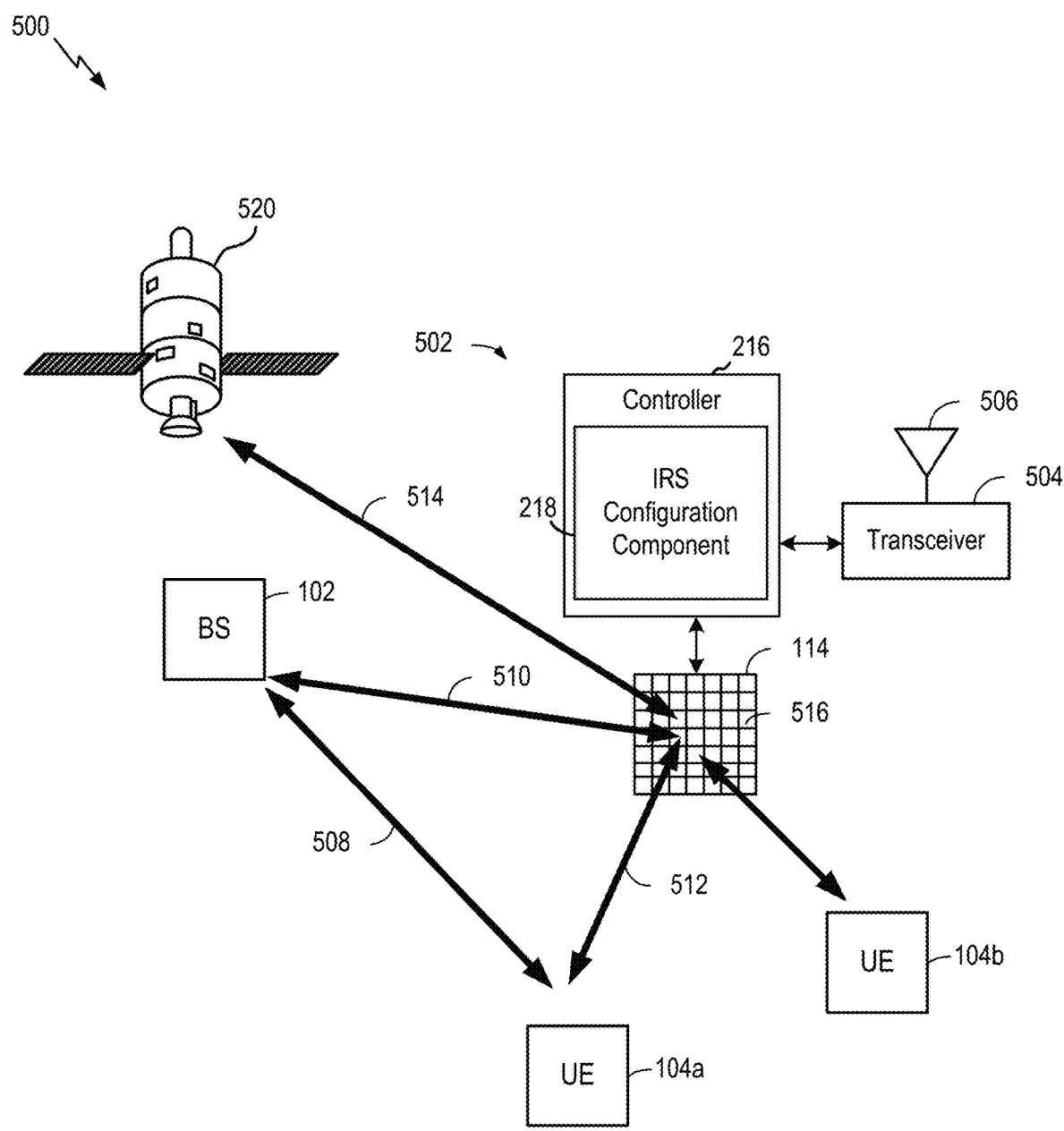
FIG. 5 is a diagram illustrating an example wireless communications network with an ad hoc IRS.

The IRS 114 may be configured or controlled by a controller 216. Reflection elements may re-radiate radio signals between the UE and BS with certain phase shifts or amplitude changes as controlled by the controller 216. The controller 216 may reconfigure the phase or amplitude changes by applying a precoding weight to reflection elements to enable the IRS 114 to re-radiate an output beam at different directions (e.g., elevation and/or azimuth) given a particular input beam. An illustrative deployment example of the IRS 114 is shown in FIG. 5. According to the present disclosure, the controller 216 includes an IRS configuration component 218 that may configure the IRS for communications between the UE and BS, in accordance with aspects described herein.

While the controller 216 is depicted as a separate network entity in communication with the IRS 114 to facilitate understanding, aspects of the present disclosure may be applied to the controller 216 being integrated or co-located with the IRS 114, the B S 102, and/or another UE.

While the user equipment 104 is described with respect to FIGS. 1 and 2 as communicating with a base station and/or within a network, the user equipment 104 may be configured to communicate directly with/transmit directly to another user equipment 104, or with/to another wireless device without relaying communications through a network. In some aspects, the base station 102 illustrated in FIG. 2 and described above is an example of another user equipment 104.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, as described herein, wirelessly communicating with an intelligent reflecting surface may use beamforming in mmWave bands and/or other frequency bands.

Introduction to Communications with an Intelligent Reflecting Surface

An intelligent reflecting surface (IRS) may be deployed to reflect electromagnetic waves in specified directions based on electrical control applied across the IRS. An IRS may be considered a surface that includes densely packed, very small surface elements (e.g., reflecting elements). Each surface element has a controllable reflection coefficient, by which the phase-shift between the incident and reflected rays to/from the surface element can be controlled.

By properly setting the surface phase (e.g., the phases of reflection coefficients of certain surface elements), a downlink beam from a base station (BS) can be reflected from the IRS towards a user equipment (UE) or vice versa in the uplink. An IRS may help reduce path loss and/or avoid blockages in the line-of-sight propagation as further described herein.

An IRS can provide directional control of the reflected wave/beam and introduce lower losses due to reflection compared to other reflectors (e.g., a wall or passive repeater). In some cases, an IRS may operate without substantial power consumption when the IRS operates passively to reflect or refract beams from a transmitter toward a receiver. In some cases, the reflection or refraction direction of an IRS may be controlled by a controller, such as a base station, network controller, or a UE (e.g., a sidelink monitoring UE). An IRS may be implemented in sidelink communications, e.g., vehicle-to-everything and/or device-to-device (D2D) communications.

An IRS can alter the nature of the communication environment. An IRS may enable the reflection of transmission around a blockage, especially in mmWave bands, for example, as described herein with respect to FIG. 4. In certain cases, the direct path may be weak due to blockage, where the path through the IRS is dominant (as reflection losses may be minimal). An IRS may enable signal enhancement through additional signal paths (e.g., a line of sight path from a transmitter and an indirect path from a IRS) to a UE. For example, the IRS may adjust the reflected wave to constructively enhance with a line of sight signal at the receiver.

Figure 4:
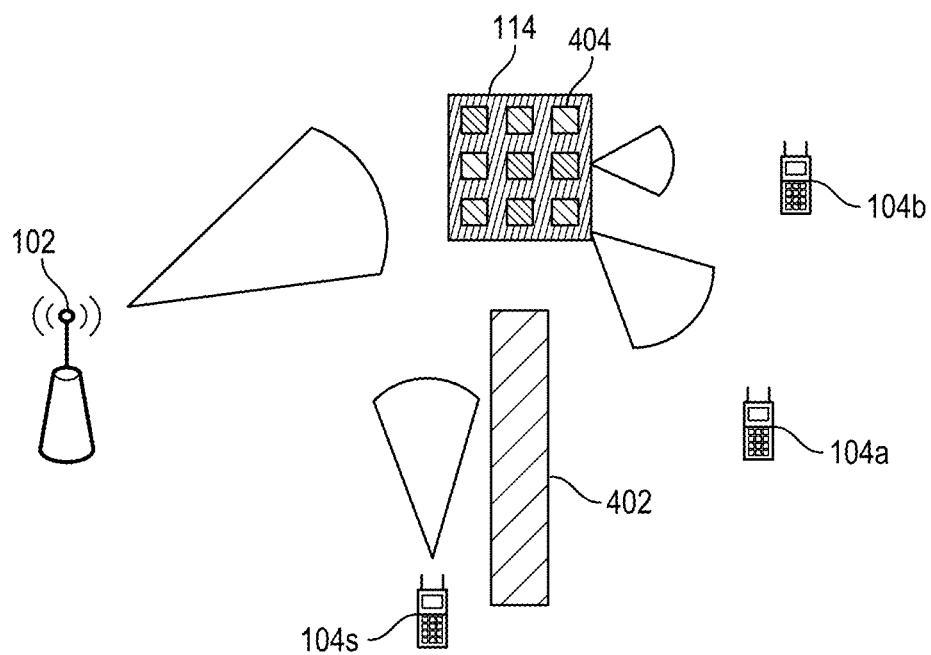
FIG. 4 illustrates an example of using an intelligent reflecting surface (IRS) in a wireless communications network.

FIG. 4 illustrates an example of using an IRS (such as the IRS 114 of FIGS. 1 and 2) to overcome blockage 402 in a wireless communications network. As shown, an IRS 114 may be arranged to reflect or otherwise re-radiate the radio signals from the BS 102 to bypass the blockage 402. For example, the two-way communications between the BS 102 and the UE 104a may be enabled by the IRS 114 re-radiating one or more beams from the BS 102 toward the UE 104a, or vice versa. Furthermore, the IRS 114 can also be configured (e.g., directing incoming and outgoing beams at different angles) to enable the UEs 104s and 104a to communicate via sidelink channels, for example, around the blockage 402.

The IRS 114 may perform passive beamforming. For example, the IRS 114 may receive signal power from the transmitter (e.g., the BS 102, UE 104a, or UE 104s) proportional to a number of reflecting elements 404 thereon. In certain cases, the reflecting elements can be referred to as surface elements or meta-atoms. When the IRS reflects or refracts the radio signal, the reflecting elements 404 cause phase shifts to perform conventional beamforming or precoding. The phase shifts may be controlled by precoding weights (e.g., a multiplier or an offset of time delay) applied to the reflecting elements. For an array of reflecting elements, such as an m×n rectangular matrix, for example, a respective precoding weight may be generated or specified for each of the reflecting elements by a controller. In certain aspects, the IRS 114 may be implemented as a reflectarray with a passive antenna array, such that the reflecting element 404 may be implemented as an antenna coupled to a phase shifter. In certain aspects, the IRS 114 may be implemented with metasurfaces, such that the reflecting element 404 may be implemented as a reconfigurable metasurface that can impose an amplitude and/or phase profile on an incident RF signal. The reflecting elements can be controlled to reflect an incident electromagnetic wave in a certain direction (e.g., azimuth and/or elevation) and/or with a certain beamwidth.

Aspects Related to an Ad Hoc Intelligent Reflecting Surface

Aspects of the present disclosure provide techniques and apparatus for communicating with an ad hoc intelligent reflecting surface (IRS). An ad hoc IRS may be a portable reflecting device that can be temporarily deployed and controlled by a user in a wireless communication network, where the position and orientation of the IRS may change at will. The ad hoc IRS may be collapsible, foldable like a map, or capable of being rolled like a mat to facilitate portability.

In certain cases, the flatness of the surface of the ad hoc IRS may not be guaranteed, for example, due to the portability of the IRS. The ad hoc IRS may be capable of being dismantled into segments and set up into a reflecting device to facilitate portability. A UE may be paired with an ad hoc IRS and control the operation of the ad hoc IRS. For example, the UE may configure the IRS to focus transmissions from a base station to the UE and focus transmission from the UE to the base station. In certain aspects, the network may be unaware of the ad hoc IRS, such that a UE paired with the IRS is the only device that can configure the IRS. The network may not store any information related to the IRS.

The techniques and apparatus for communicating with an ad hoc IRS described herein may enable improved wireless communication performance, such as reduced latencies and/or increased throughput, for example, due to the ad hoc IRS providing a higher gain as a transceiver compared to a user equipment.

FIG. 5 is a diagram illustrating an example wireless communications network 500 with an ad hoc IRS, in accordance with certain aspects of the present disclosure. As shown, a wireless device 502 may include the IRS 114, the controller 216, and a transceiver 504. In certain cases, an ad hoc IRS may refer to a configurable reflecting device, such as the wireless device 502. In certain aspects, the wireless device 502 may control a plurality of IRSs 114. The controller 216 may be coupled to the transceiver 504, which may be configured to transmit (or send) and receive signals for the wireless device 502 via an antenna 506, such as the various signals described herein. The wireless device 502 may receive control signaling from the UE 104a via the transceiver 504. For example, the UE 104a may provide certain commands to configure the radiation pattern of the reflections (e.g., focused beams as further described herein with respect to FIG. 7) at the IRS 114. The controller 216 may adjust the phase shifts applied at subareas 516 of reflecting elements (e.g., the reflecting element 404) for co-phasing/beamforming.

The UE 104a may communicate directly with the BS 102, for example, via the direct link 508, which may include a direct path or a multipath. The UE 104a may communicate indirectly with the BS 102, for example, through the IRS 114 via the indirect links 510, 512. For example, the IRS 114 may receive signals from the BS 102 on the indirect link 510 and reflect or refract the signals, for example, on the indirect link 512 towards the UE 104a. The controller 216 may adjust the beamwidth, direction (e.g., azimuth and/or elevation), and/or radial distance of the (virtual) focal point of the reflections from the IRS 114.

In general, configuration of the surface phase of an ad hoc IRS (e.g., the IRS 114) may include three operations: segmentation of the IRS surface area into subareas where each subarea may be sufficiently smooth and large to reflect measurable energy; beamforming from each subarea towards the UE; and determining co-phasing coefficients (phase offsets) for each subarea to coherently combine the beams from each subarea received at the UE. Any or all of the operations may be performed again after initialization, for example, in response to the UE 104a changing its location relative to the IRS 114.

Figure 6:
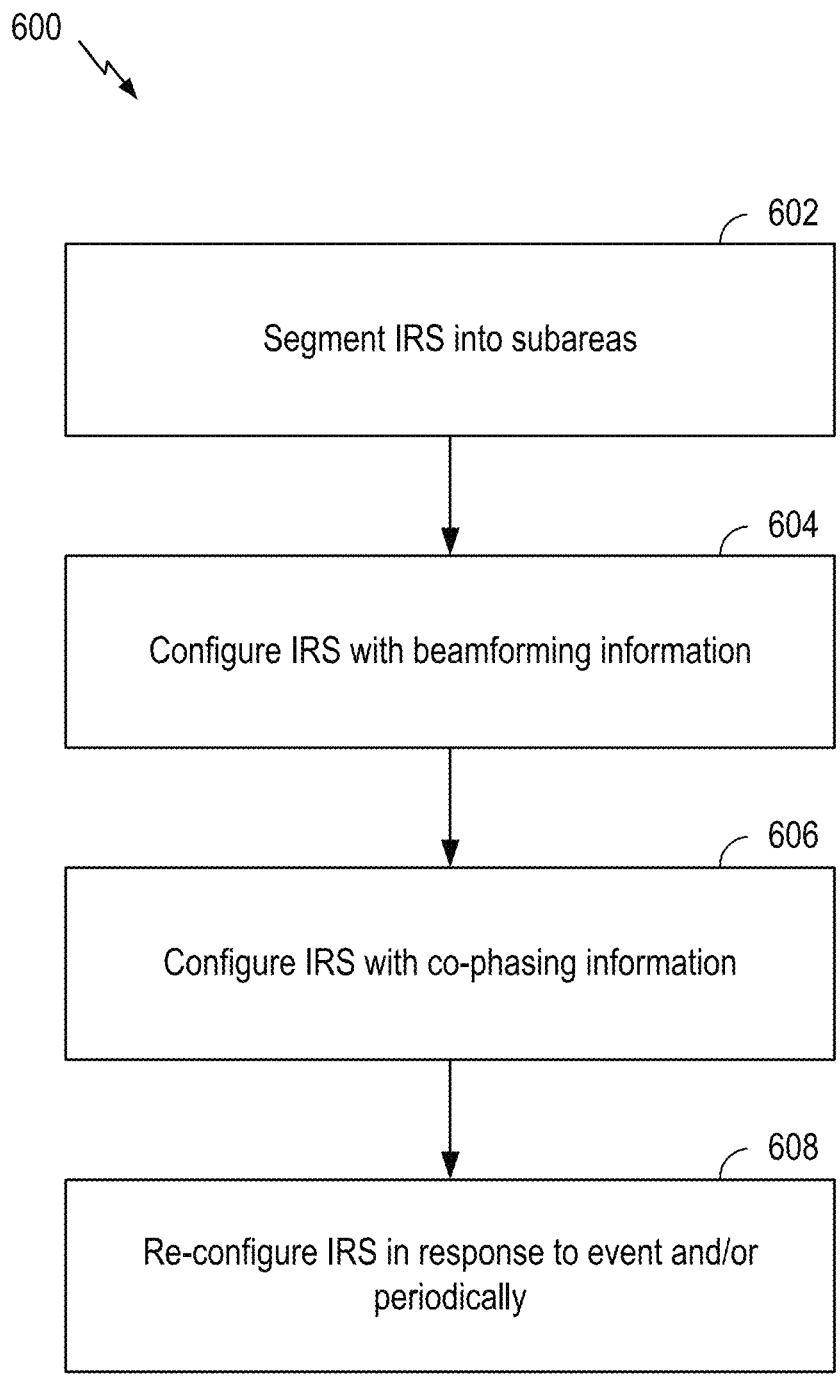
FIG. 6 is a flow diagram illustrating an example operations for configuring an ad hoc IRS.

FIG. 6 is a flow diagram illustrating example operations 600 for configuring an ad hoc IRS, in accordance with certain aspects of the present disclosure. The operations 600 may be performed, for example, by a UE (such as the UE 104a in the wireless communication network 500). The operations 600 may optionally begin at block 602, where the UE may segment the IRS into subareas, such as the subareas 516. The subarea segmentation operation may be based on prior knowledge of characteristics of the IRS, such as the arrangement of flat areas and/or creases across the surface of the IRS. For example, the IRS may be segmented into subareas where subareas boundaries may be arranged along creases of the IRS. Segmentation of the subareas may be updated by merging and/or dividing the segments based on similarity of the surface phase gradients and measured RSRP from each subarea.

Figure 8A:
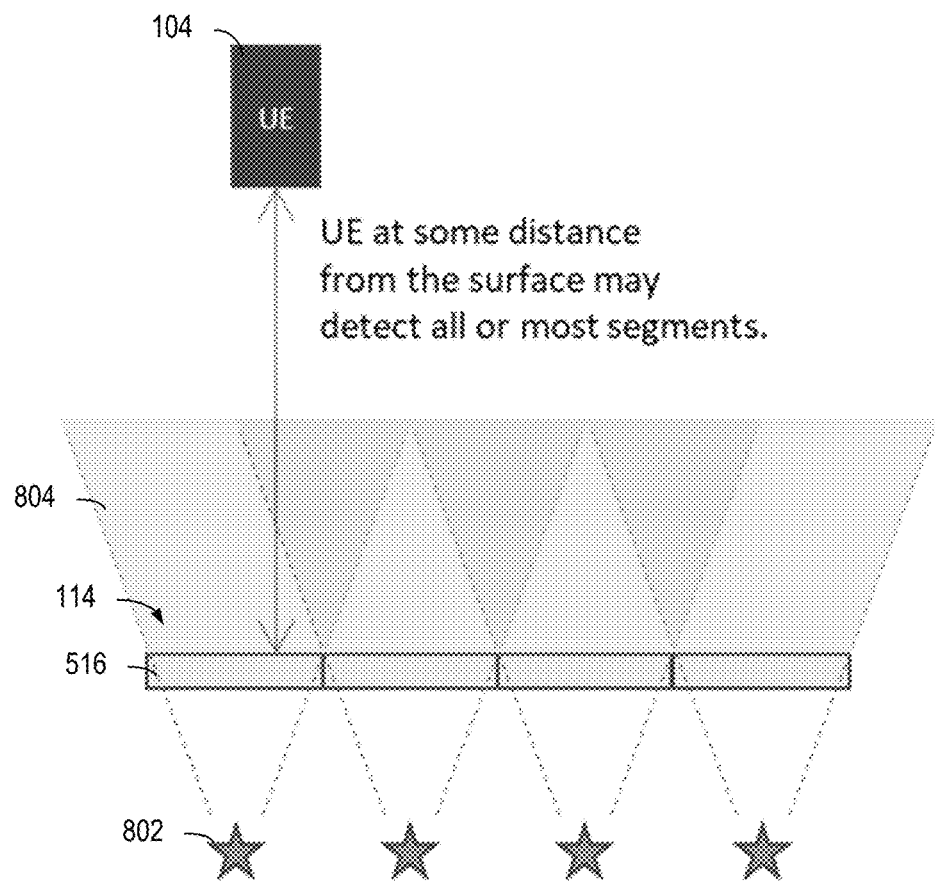
FIG. 8A is a side view of an example IRS defocusing reflection patterns to a UE, in accordance with certain aspects of the present disclosure.
Figure 9A:
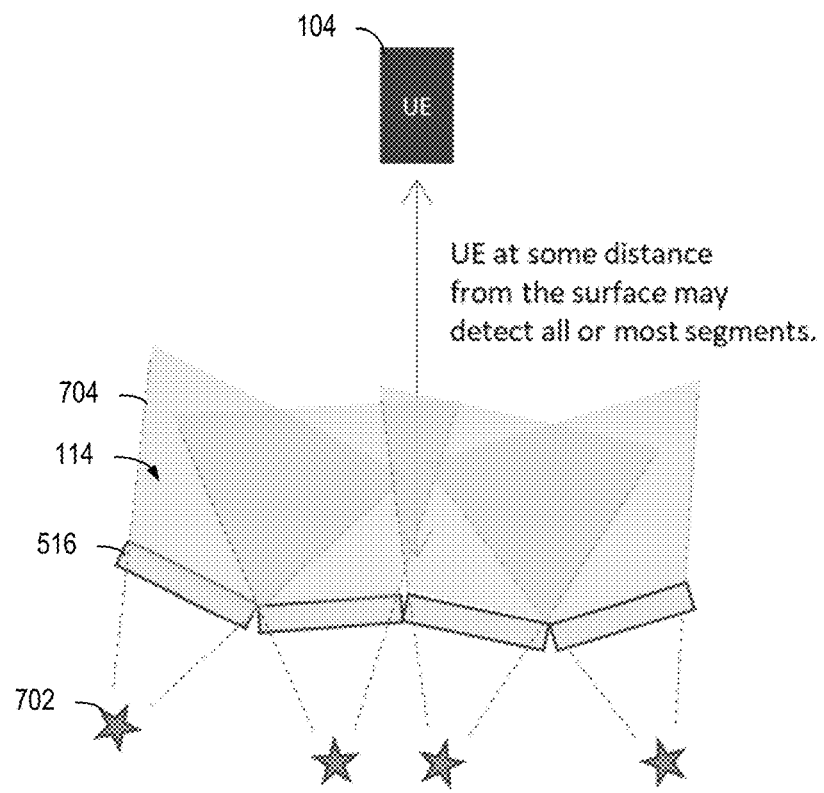
FIG. 9A is a side view of another example IRS defocusing reflection patterns to a UE, in accordance with certain aspects of the present disclosure.

At block 604, the UE may configure the IRS with beamforming information, such as a beamforming surface phase associated with each of the subareas of the IRS. The beamforming from each subarea to the UE may follow at least one of two approaches. In a first approach, the beam from each subarea may be a wide beam formed using a virtual focal point per subarea such that the coverage area of the beam is likely to include the UE location. In this approach, if a low RSRP is measured at the UE for the subarea (e.g., an RSRP less than or equal to a threshold value), the corresponding virtual focal point may be adjusted to a different position. For example, the virtual focal point may be initially centered to a subarea, for example, as depicted in FIGS. 8A and 9A, and if a low RSRP is measured at the UE, a location closer to an edge of the subarea may be chosen for the virtual focal point. The end result of the first approach may look like as shown in FIG. 9A.

Figure 8B:
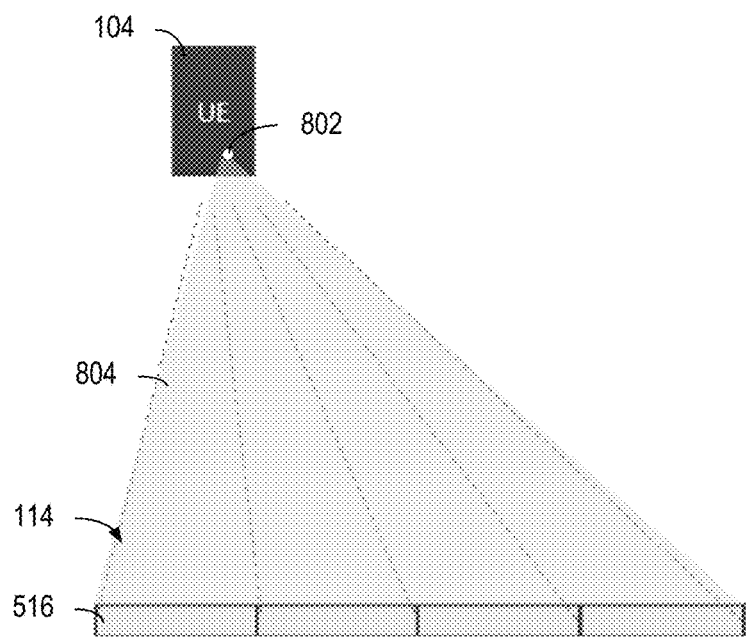
FIG. 8B is a side view of an example IRS focusing reflection patterns to a UE, in accordance with certain aspects of the present disclosure.
Figure 9B:
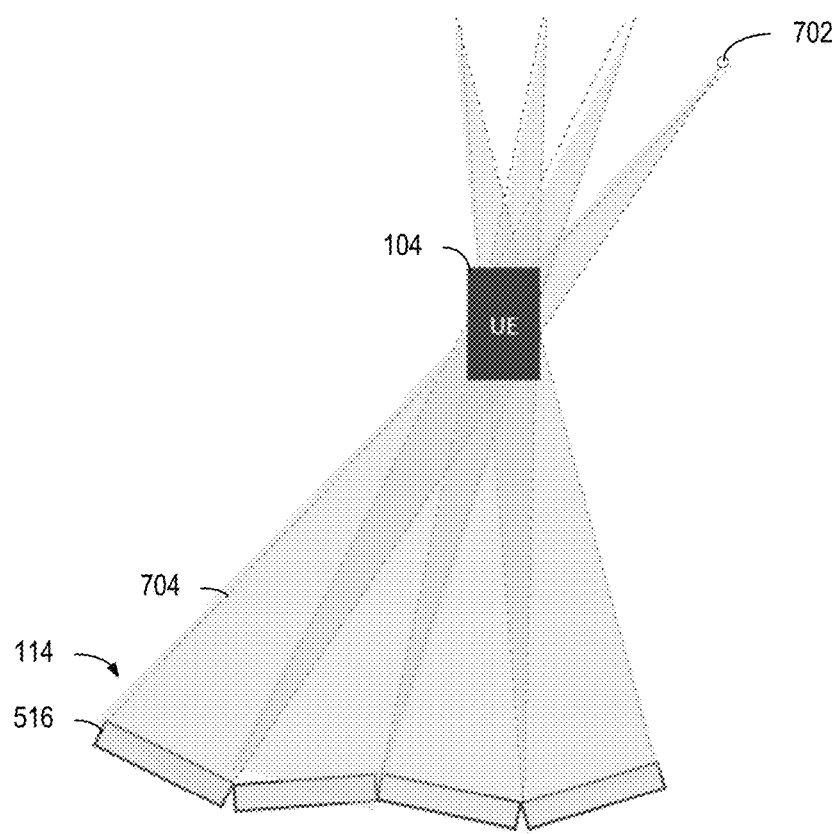
FIG. 9B is a side view of another example IRS beamforming reflection patterns to a UE, in accordance with certain aspects of the present disclosure.
Figure 11A:
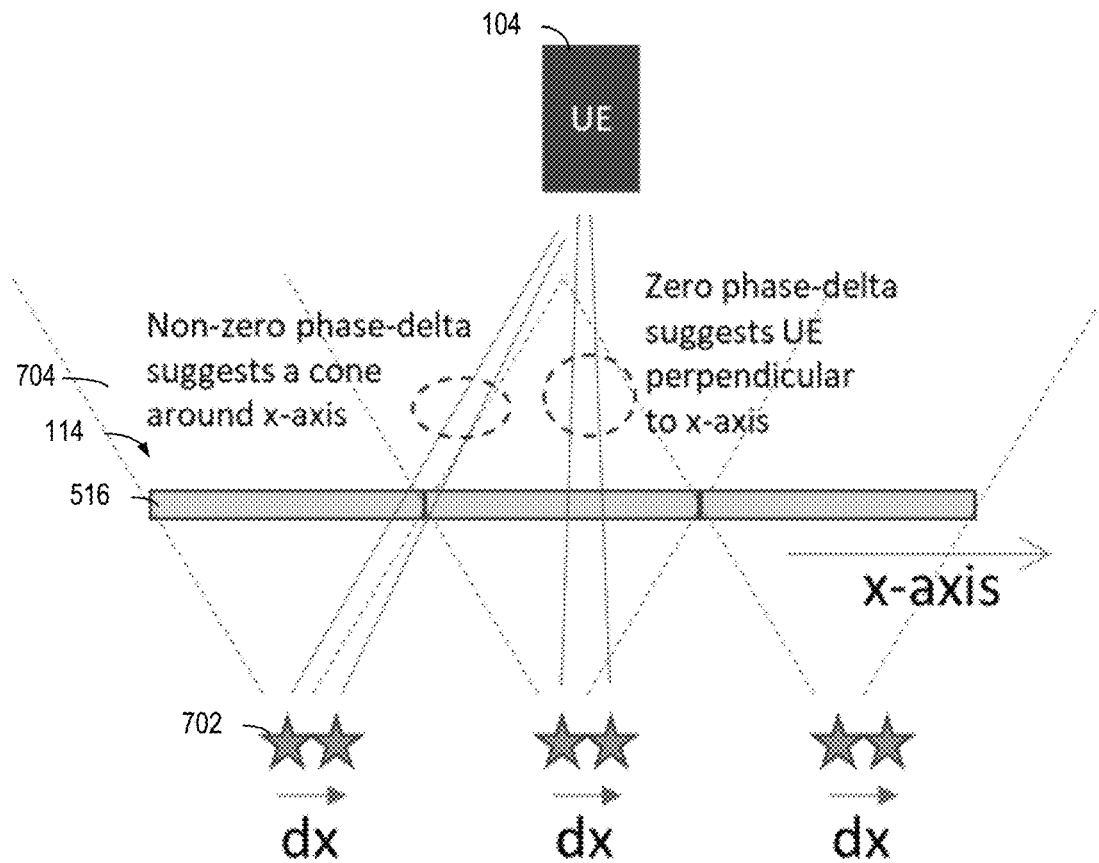
FIGS. 11A and 11B are side views illustrating examples of focal point adjustments of an IRS, in accordance with certain aspects of the present disclosure.
Figure 11B:
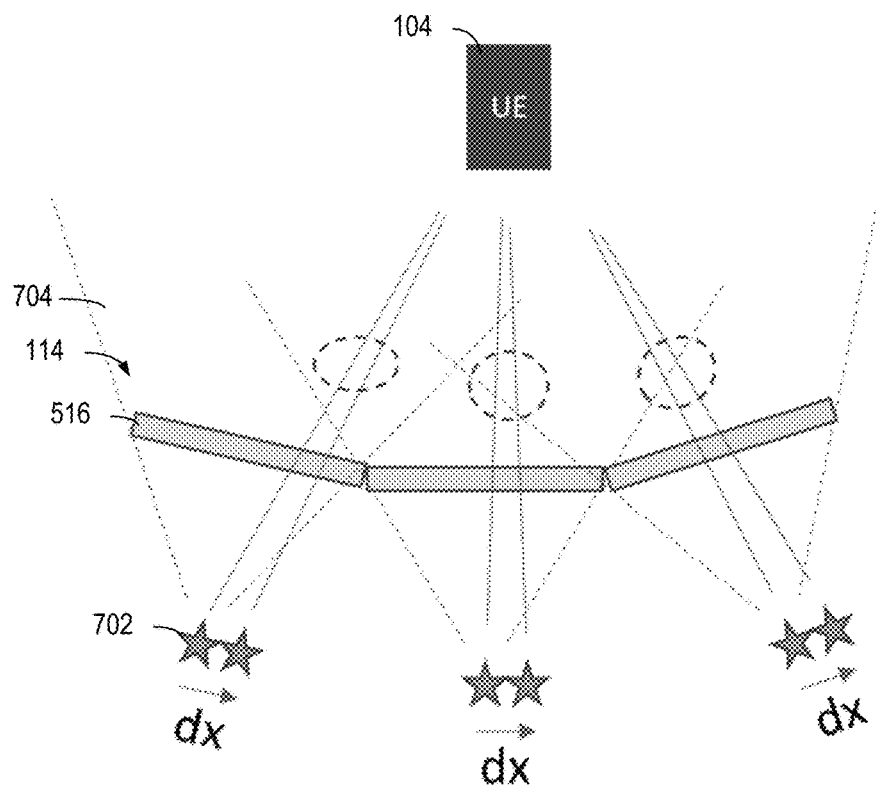

In a second approach, the gradient of the surface phase used to beamform in the direction of the UE may be determined by measuring phase changes in the received signal at the UE when a virtual focal point of a subarea is adjusted by a small amount (e.g., by dx and dy in two linearly independent directions, x and y-directions, parallel to the subarea, respectively), for example, as described herein with respect to FIGS. 11A and 11B. The surface phase gradient may be mapped to a logical angle of departure (AoD) vector, which may be referred to as a virtual angle-of-departure. The logical or virtual AoD may represent an AoD determined and/or used at the UE to configure the IRS. The logical or virtual AoD may not correspond to an actual AoD of a radiation (or reflection) pattern emitted at the IRS. The mapping may be used where the IRS controller is expecting an angle of departure vector for surface phase programming. In addition to the surface phase gradient (or, equivalently, the virtual angle of departure), an approximate radial distance from the subarea to the UE may also be used if available to focus signals to the UE. If no radial information is available or unknown, the radial distance can be chosen as infinity. The location of the focal point per subarea may be adjusted until one or more properties of signals (e.g., RSRP) received at the UE 104a satisfy a threshold, for example, as depicted in FIGS. 8B and 9B. The end result of the second approach may look like FIG. 9B. Even though the second approach uses (real) focal points for beamforming towards the UE, the preceding surface phase gradient (virtual AoD) computation may be based on virtual focal point perturbation, for example, as shown in FIG. 11B.

At block 606, the UE may configure the IRS with co-phasing information, such as co-phasing coefficients for each of the subareas. In the co-phasing operation, the phase of the signal received from each subarea may be determined by channel estimation and the negative of the phase is added to the surface phase of the subarea to produce coherent combining across subareas at the UE receiver.

At block 608, the UE may re-configure the IRS in response to one or more events and/or on a periodic basis. For example, the UE may re-reconfigure the IRS in response to detecting that the UE has changed position relative to the IRS. In certain cases, the UE may detect such a change based on a change in virtual angles-of-departure associated with the subareas of the IRS being larger than a threshold. The UE may perform any of the operations described herein related to configuring the IRS, such as subarea segmentation at block 602, configuring beamforming at block 604, and/or configuring co-phasing at block 606.

At various operations, estimation of the complex channel for each subarea may be performed while a subarea is configured with a focal or a virtual focal point. The channel estimation may be performed at least by using the reference signals transmitted by the network node and using at least one of two operations: (1) by activating a single subarea of interest with a specific surface phase in any given measurement time interval, or (2) by activating all subareas and imposing an orthogonal cover code (OCC) phase on top of the surface phase programming for each subarea, for example, as described herein with respect to FIG. 10. In the latter approach, the entire surface of the IRS may be active over a number of measurement intervals (which may provide better measurements at the UE compared to activating a single subarea at a time) with a different OCC being applied in each interval. Forming reflections with the entire surface of the IRS may provide better measurements at the UE compared to activating a single subarea at a time, for example, due to the higher gain available from the entire surface of the IRS. The orthogonality of cover codes allows subsequent inversion of the cover codes to reveal channel estimates for each subarea.

Referring to FIG. 5, as the UE 104a may be unaware of the positions of the BS 102 and the IRS 114 as well as the orientation of the IRS 114, the UE 104a may adjust the subarea segmentation and/or beamforming performed at the IRS 114 until one or more properties of signals (e.g., RSRP) received at the UE 104a satisfy a threshold. Segmentation of the subareas may be be adjusted by merging subareas and/or further dividing subareas, for example, based on the similarity of surface phase gradients among adjacent subareas. Beamforming can be adjusted by varying the location of the virtual focal points or the radial distance of the (real) focal points. The signal properties measured at the UE may include, for example, a channel quality indicator, a signal-to-noise ratio (SNR), a signal-to-interference plus noise ratio (SINR), a signal-to-noise plus distortion ratio (SNDR), a received signal strength indicator (RSSI), a reference signal received power (RSRP), a reference signal received quality (RSRQ), and/or a block error rate (BLER).

The UE 104a may adjust parameters (e.g., radial distance of the focal points as described herein with respect to FIG. 9B between the UE 104a and the IRS, elevation, azimuth, etc.) for beamforming until certain properties of signals received at the UE 104 satisfy the threshold. The UE 104a may determine a virtual focal point of a reflection (for producing a wide beam) pattern with respect to a subarea and set the surface phase according to the following expression:

$$\Gamma_n = e^{j2\pi(d_{1,n} - d_{2,n})/\lambda} \tag{1}$$

where $\Gamma_n$ is the reflection coefficient of surface element n, $d_{1,n}$ is the distance between base station and the surface element n, $d_{2,n}$ is the distance between the virtual focal point and the surface element n, and $\lambda$ is the operating wavelength. Virtual focal points result in defocused or wide beams, and thus the virtual focal points are useful when there is incomplete information regarding base station and/or UE locations due to the wide coverage area of the reflection pattern. As the UE 104 may only be aware of $d_{2,n}$, the UE 104 may assume $d_{1,n}$ is equal to a specific value (e.g., zero). For example, Expression (1) may be evaluated as follows:

$$\Gamma_n = e^{-j2\pi d_{2,n}/\lambda} \tag{2}$$

In general, Expression (2) may represent the assumption that the BS 102 is positioned straight ahead of the local surface normal to the IRS 114. In certain cases, the wide beamwidth of the beam produced using a virtual focal point may offset the error due to the unknown base station location. If the measured signal quality is below a threshold, the UE 104a may use one or more other locations for the virtual focal point with respect to the subarea. The UE 104a may also adjust the location of the virtual image of the BS 102 in certain directions, for example, in increments of dx and dy along an x-axis and y-axis, respectively, for the purpose of estimating the surface phase gradient as a preliminary operation to form a beam oriented towards the UE 104a. The UE 104a may measure the phase changes of the reflected signals. Due to the arbitrary position of the virtual image of the BS 102, the reflected beam may be in arbitrary direction relative the UE 104a. In certain aspects, the reflected beam from the IRS 114 may be wide enough to cover the UE 104a. If the reflected beam is not wide enough, the UE 104a may adjust the location of the virtual focal point of a subarea, for example, as described herein with respect to FIGS. 8A-11B. The virtual focal point of a subarea may be moved by dx and dy parallel to a local surface of the IRS 114. The UE 104a may measure the rate of change of phase in x and y directions, and the UE 104a may set the surface phase of the IRS 114 to beamform or focus a reflection towards the UE 104a. In all of these use cases of Expression (2), a separate virtual focal point and a resulting surface phase may be applied to each subarea of the IRS.

As the UE 104a may be unaware of the positions of the BS 102 and the IRS 114 as well as the orientation of the IRS 114, the UE 104a may determine virtual parameters for beamforming, such as virtual angles of departure, virtual angles of arrival, virtual radial distances, and/or virtual focal points. The virtual parameters may enable the UE 104a to quantify the surface phase programming for beamforming at the IRS 114 (e.g., if the IRS controller is expecting an angle of departure vector for surface phase programming). In certain aspects, the virtual parameters may be used for interpolating surface phases across subareas of the IRS 114.

In certain cases, the UE 104a may be located in a coverage area of a non-terrestrial network (NTN) 520, such as a satellite. Some NTNs may employ airborne platforms (e.g., a drone or balloon) and/or spaceborne platforms (e.g., a satellite) for wireless communications. The NTN 520 may communicate with the BS 102 and/or the UE 104a. The NTN 520 may be a serving cell for the UE 104a. In certain aspects, the NTN 520 may act as a relay (or a remote radio head) for the BS 102 and the UE 104. In certain cases, a user may deploy the IRS 114 to improve communications (e.g., signal quality) between the NTN 520 and the UE 104a. The IRS 114 may reflect or refract signals between the NTN 520 and the UE 104a via the indirect links 514, 512. As the IRS 114 may have a larger surface area than the UE 104a, the IRS 114 may provide a higher gain than the UE 104a for transmitting signals to the NTN 520 and/or for receiving signals from the NTN 520. The UE 104a may control the IRS 114 to focus or beamform reflections on the NTN 520 and/or the UE 104a.

A blockage may be located between the UE 104a and the BS 102. For example, the UE 104a may be located in an indoor environment (e.g., an office building, apartment, house, etc.). In some cases, the BS 102 may be located outside of the indoor environment, such that mmWave coverage in the indoor environment is degraded for the UE 104*a*. In certain cases, the BS 102 may be arranged in the indoor environment in a location where the coverage is degraded for the UE 102, for example, in a different room or floor. In such cases, the IRS 114 may enable the UE 104 to communicate with the BS 102, for example, due to the higher gain available to the IRS 114 and/or due to reflecting signals around the blockage, for example, as described herein with respect to FIG. 4.

In certain aspects, the IRS 114 may be shared among multiple UEs 104*a*, 104*b*. The IRS 114 may serve multiple UEs 104*a*, 104*b* in a given area. In certain cases, the IRS 114 may be capable of serving only one UE at a time. In such cases, the network may use time division multiplexing to schedule the usage of the IRS 114 among the multiple UEs 104*a*, 104*b*. The BS 102 may schedule the first UE 104*a* to use the IRS 114 in a first set of time resources (e.g., one or more symbols or slots), and the BS 102 may schedule the second UE 104*b* to use the IRS 114 in a second set of time resources. The BS 102 may indicate the IRS 114 in the scheduling (e.g., downlink control information (DCI)) via spatial parameters (e.g., angle of arrival and/or departure). For example, the BS 102 may provide a transmission configuration indicator (TCI) state in the scheduling, where the TCI state may be indicative of spatial parameters associated with the IRS 114.

When a single UE is using the IRS, the UE may be able to use the IRS at any time without consideration for other UEs. In such cases, the base station may not be aware that the UE is capable of using an IRS. When multiple UEs are sharing the same IRS, a TCI state in the scheduling DCI may indicate that a specific UE can take control of (or use) the IRS. In such cases, the base station may be aware of the UEs sharing the same IRS. The base station may not simultaneously schedule UEs sharing the same IRS. In certain aspects, the UE controlling the IRS may inform the network not to schedule the UEs using the IRS simultaneously. Alternatively, the UEs may be scheduled simultaneously by using two possible values for the TCI state (or another field) in the scheduling DCI. A first value may indicate that a UE can take control of the IRS, and a second value may indicate that the UE is scheduled but is not allowed to use the IRS. The UE controlling the IRS may inform the network to use different TCI states to indicate which UE can take control of the IRS.

Figure 7:
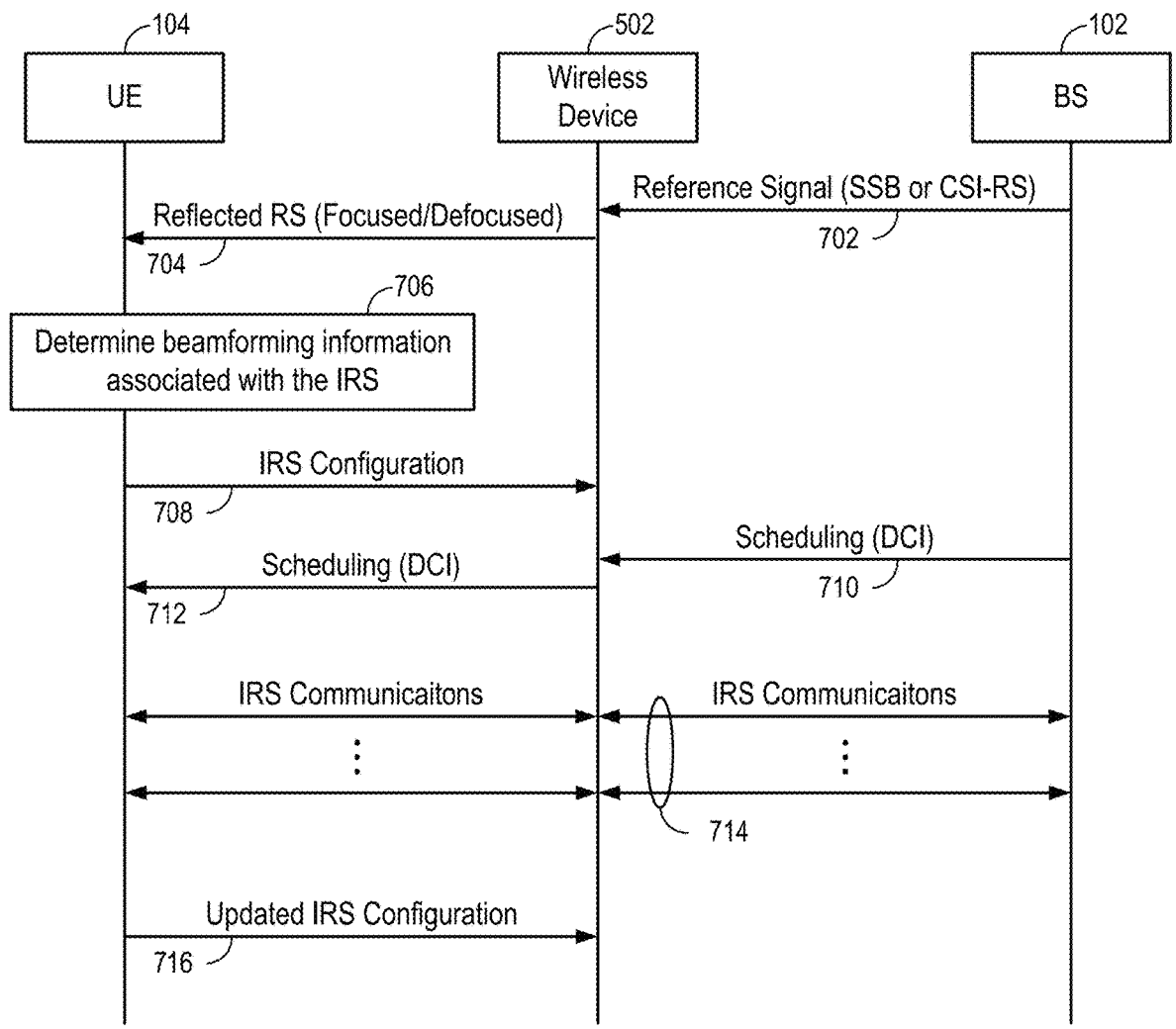
FIG. 7 is a signaling flow illustrating example signaling for communicating with an ad hoc IRS.

FIG. 7 is a signaling flow illustrating example signaling for communicating with an ad hoc IRS, in accordance with certain aspects of the present disclosure. At activity 702, the BS 102 may transmit signals (e.g., reference signals), for example, in certain beam directions, as depicted in FIG. 1. The BS 102 may transmit periodic reference signals, semi-persistent reference signals, and/or aperiodic reference signals. The reference signals may include a synchronization signal block (SSB) and/or a channel state information reference signal (CSI-RS), for example.

At activity 704, the wireless device 502 may reflect the signals from the BS 102 via an IRS (e.g., the IRS 114). The IRS may reflect the signals in a beamformed, focused, or defocused reflection pattern as further described herein with respect to FIGS. 8A-11B. In certain cases, the IRS may be divided into subareas (e.g., the subareas 516), and the IRS may activate each of the subareas one at a time and/or activate all of the subareas at the same time (e.g., using an orthogonal cover) to reflect the signals, for example, as described herein with respect to FIGS. 10-11B. The number of subareas and/or the number of reflection elements in each subarea may be configurable. The UE may determine the number of subareas and/or the number of reflection elements in each subarea, for example, based on measurements of the received signals. The UE may configure the IRS with different number of subareas (or different methods of partitioning the IRS into subareas) and measure properties (e.g., RSRP) of the received signals for the different subarea configurations. For example, the UE 104 may select the subarea configuration that provides the strongest signal quality for the received signals at the UE 104.

At activity 706, the UE 104 may receive the reflected signals from the IRS and measure properties associated with received signals, such as a phase shift and/or a received power (e.g., a RSRP). The UE 104 may adjust the beamforming of the IRS until the measured properties of the reflected signals satisfy a threshold, for example. The UE 104 may determine beamforming information associated with the IRS for communications between the UE 104 and the BS 102. For example, the UE 104 may determine co-phasing terms (e.g., beamforming weights and/or phase shifts for reflection elements) for each of the subareas (e.g., the subareas 516) of the IRS. The phase of the co-phasing coefficient for each subarea may be added to the surface phase of the subarea such that beams from each subarea combine in-phase (e.g., coherently) at the UE.

At activity 708, the UE 104 may transmit, to the wireless device 502, a configuration indicating the determined beamforming information associated with the IRS. For example, the UE 104 may configure the IRS to reflect signals from the BS 102 to the UE 104 using a beamformed reflection pattern, which may be focused or defocused. In some cases, the UE 104 may configure the IRS to reflect signals from the UE 104 to the BS 102 using a beamformed reflection pattern.

In certain cases, the UE 104 may share the use of the IRS with other UEs, for example, as described herein with respect to FIG. 5. At activities 710 and 712, the UE 104 may receive, from the BS 102 via the IRS, scheduling indicating time resources for using the IRS to communicate with the network entity. For example, the scheduling may include a DCI message such as a specific DCI format. A TCI state in the scheduling DCI may indicate that the UE 104 can take control of (or use) the IRS for communications with the BS 102.

At activity 714, the UE 104 may communicate with the BS 102 via the IRS. For example, the IRS may reflect signals from the UE 104 to the BS 102 and/or reflect signals from the BS 102 to the UE 104, for example, as depicted in FIG. 5.

In certain aspects, the UE 104 may reconfigure the IRS with an updated configuration, for example, periodically and/or in response to a certain event. At activity 716, the UE 104 may transmit an updated configuration for the IRS to the wireless device 502. The UE 104 may transmit an updated configuration periodically, for example, every 5 seconds, 10 seconds, etc. The UE 104 may track the properties of received signals from the IRS. For example, the UE 104 may track the signal quality (e.g., RSRP) of reflected signals from the IRS or the surface phase gradients (equivalently, virtual angles of departure from subareas) of the subareas. If the signal quality fails to satisfy a threshold or if the surface phase gradients or virtual angles of departure of the subareas have changed by more than a threshold, the UE 104 may update the configuration for the IRS. The UE 104 may track its location relative to the IRS, for example, in terms of surface phase gradient or a virtual angle of departure of a reflection pattern from each subarea of the IRS. If the location of the UE 104 has changed (e.g., by a certain threshold), the UE 104 may update the configuration for the IRS.

FIG. 8A is a side view of an example IRS defocusing reflection patterns to a UE, in accordance with certain aspects of the present disclosure. As shown, each of the subareas 516 of the IRS 114 may defocus a reflection (re-radiation) pattern 804 based on certain positions for virtual focal points 802. In this example, the virtual focal points 802 may be located behind the center of each of the subareas by a certain distance. A focal point may represent a point where the reflection (re-radiation) pattern of an IRS (or subarea thereof) appears to converge or diverge. A virtual focal point may represent a convergence point of a reflection pattern that appears to be positioned behind the IRS, for example, opposite to the reflecting/radiation side as depicted in FIG. 8A. A defocused reflection (re-radiation) pattern of an IRS may have a virtual focal point located behind the IRS, such as behind a subarea of the IRS. Defocusing a reflection (re-radiation) pattern may include arranging a focal point behind the IRS, such as behind a subarea of the IRS.

FIG. 8B is a side view of an example IRS focusing reflection patterns to a UE, in accordance with certain aspects of the present disclosure. As shown, each of the subareas 516 of an IRS 114 may focus a reflection (re-radiation) pattern 804 on the UE 104. In some cases, the reflection pattern 804 may converge on a focal point 802, which may coincide with the location of the UE 104. A focused reflection (re-radiation) pattern of an IRS may have a focal point located in front of the IRS, such as in front of a subarea of the IRS. Focusing a reflection (re-radiation) pattern may include arranging a focal point in front of the IRS, such as in front of a subarea of the IRS. The IRS 114 may use co-phasing term(s) for the reflection element(s) (e.g., the reflection elements 404) in the respective subarea 516 to form the reflection pattern. The co-phasing terms may be indicative of phase shifts for the reflection elements to form the reflection pattern. The co-phasing terms may include beamforming weights and/or phase shifts.

FIGS. 9A and 9B are side views of an example IRS defocusing or beamforming partially focused reflection patterns to a UE, in accordance with certain aspects of the present disclosure. In these examples, the IRS 114 may have subareas 516 arranged in arbitrary or unknown orientations, where each of the subareas 516 of the IRS 114 may defocus or beamform a reflection (re-radiation) pattern 804 based on certain positions for virtual focal points 802. It will be appreciated that the IRS 114 may beamform, focus, or defocus the reflection pattern on any receiving entity, such as a wireless communication device or a base station. In the examples shown in FIGS. 9A and 9B, reflections from each subarea may be co-phased at the receive antenna of the UE, for example, by measuring the channel from each subarea and adding the negative of the phase of the channel to the surface phase of the subarea.

The UE 104 may configure the IRS 114 to optionally begin with defocused reflection patterns 804, for example, as depicted in FIGS. 8A and 9A. The UE 104 may adjust the reflection patterns of the IRS 114 until one or more properties of signals (e.g., RSRP) received at the UE 104 satisfy a threshold. The UE 104 may adjust the radial distance, focal point, elevation, and/or azimuth of the reflection patterns for each subarea 516 of the IRS 114. The UE 104 may configure the IRS 114 to use the beamformed or focused reflection patterns 804, as depicted in FIGS. 8B and 9B, based on the measured properties of the signals received at the UE 104.

Figure 10:
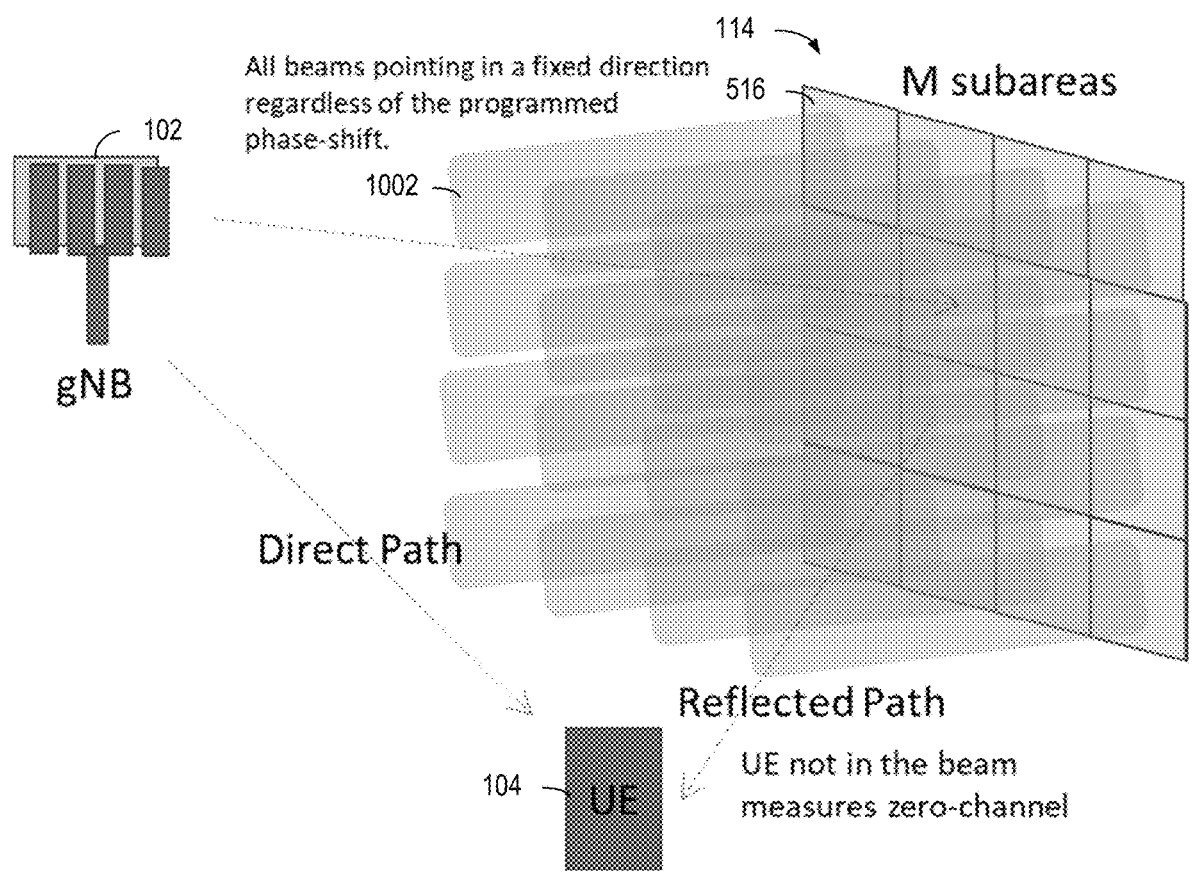
FIG. 10 is a diagram illustrating an example of an orthogonal cover from an IRS, in accordance with certain aspects of the present disclosure.

FIG. 10 is a diagram illustrating an example of an orthogonal cover from an IRS, in accordance with certain aspects of the present disclosure. In certain aspects, the orthogonal cover code may be used to estimate the channel from each subarea and/or received signal properties at various operations of using the ad hoc IRS. For example, channel estimates per subarea may be used to obtain co-phasing coefficients. In some cases, during the determination of the surface phase gradient (for example, as described herein with respect to FIG. 11), channel estimates may be used for each subarea and virtual focal point setting. In certain cases, the RSRP or other signal quality metrics may be based on estimating the channels from each subarea. As shown, the IRS 114 may reflect (or re-radiate) reflection patterns 1002 from the M subareas 516 using an orthogonal cover. In some cases, there may be a direct path between the BS 102 and UE 104. The IRS 114 may reflect the signal transmitted by the BS 102 using all subareas over M+1 occasions (e.g., symbols) with a phase shift per subarea and occasion (symbol). In some cases, the phase shift may be added on top of the surface phase used to focus or defocus each subarea, for example, as shown in FIGS. 8A-9B. For example, the IRS 114 may orient the reflection patterns 1002 using the focused or defocused radiations patterns, for example, as shown in FIGS. 8A-9B, respectively. In certain cases, the IRS 114 may orient the reflection patterns 1002 in the same direction with the same beam width pattern, for example, at a certain azimuth and elevation where the beams are oriented substantially orthogonal to the surface of the IRS 114.

The IRS 114 may reflect (or re-radiate) reflection patterns from M subareas for M+1 symbols, where in symbol$_i$, the phase of the path$_j$ for a given subarea is set based on the (j, i) element of an orthonormal (orthogonal) matrix (such as a Hadamard or a discrete Fourier transform matrix). In certain aspects, the phase of the path$_j$ may be added to the phase shift used for focusing or defocusing the radiation pattern to ensure the UE is in the radiation pattern of the reflections. For example, if the UE measures a zero-channel, the orthogonal cover phase shifts may be added on top of a surface phase for focusing or defocusing the radiation pattern toward the UE 104. The direct path from the BS 102 to the UE 104 may correspond to a phase of zero. M+1 channel coefficients can be solved for each of the subareas. The orthogonal cover operation allows activation of the whole surface of the IRS rather than a subarea, which may provide a stronger signal at the UE for determining beamforming information associated with the IRS compared to activating one subarea at a time.

FIGS. 11A and 11B are side views illustrating examples focal point adjustments, in accordance with certain aspects of the present disclosure. The perturbations of the virtual focal points may be used to measure the rate of change of signal phase received at the UE, and thus the perturbations can be used to produce a surface phase gradient (or, equivalently, the virtual angles of departure) used to orient the beam from a subarea to the UE. With an approximate estimate of the radial distance of the UE from the IRS, the surface phase gradients may be used to concentrate the signal energy at the UE, for example, as shown in FIG. 9B. As an example, each of the virtual focal points 802 may be set at the center of a corresponding subarea 516 of the IRS 114. Each of the virtual focal points 802 may be moved in a first direction (dx) with respect to the first point. Each of the virtual focal points 802 may be moved in a second direction (dy) with respect to the first point, where the x-axis and y-axis may be parallel to the IRS and linearly independent directions. The UE may measure phase differences (which may have zero integer ambiguity due to small dx and dy movements) of reflected signals from the respective subareas of the IRS when the virtual focal points 802 are moved in the different directions. In certain cases, the dx and/or dy movements may be smaller than a half wavelength of the operating frequency. In certain cases, the IRS may activate the subareas of the IRS one at a time with each of the respective virtual focal point locations. The phase differences may be converted to virtual angle-of-arrivals (AoAs) and/or angle-of-departures (AoDs) by geometric calculations, and the virtual AoAs/AoDs for different subareas 516 may be used to beamform the reflection patterns towards the UE 104, for example, as depicted in FIGS. 8B and 8B.

When beamforming each subarea towards the UE, the surface phase of each subarea may be set based on a local or virtual azimuth/elevation and radial distance to the UE. The AoA/AoD estimation procedure using virtual focal point perturbation as depicted in FIGS. 11A and 11B may yield a virtual azimuth/elevation with an estimated radial distance for the reflection patterns. The UE may adjust (e.g., increase or decrease) the azimuth, elevation, radial distance of each reflection pattern for each subarea. The UE may adjust the beamforming parameters for each of the subareas of the IRS until one or more properties of signals received at the UE satisfy a threshold or criteria. For example, the UE may adjust the beamforming parameters until an RSRP is greater than or equal to a threshold value. In certain cases, the UE may adjust the beamforming parameters through a range of values, and the UE may select the beamforming parameters that provide the best channel conditions or signal properties, such as the highest RSRP.

In certain aspects, the beamforming parameters for each subarea may be smoothed or filtered using an average or an interpolation. For example, the virtual AoA/AoD determined for each subarea may be smoothed by interpolation. The interpolation may be a quaternion interpolation. The interpolation may be over certain sets of subareas, for example, where the AoA/AoD may be expected to vary smoothly and not cross over creases or fold lines. It will be appreciated that the example focal point movements along the x-axis as depicted FIGS. 11A and 11B may be similarly performed along the y-axis or other directions (such as a z-axis) as described herein.

Referring to FIG. 11B, the IRS 114 may have subareas 516 arranged in arbitrary or unknown orientations. The UE 104 may assume the angle of incidence from the base station with respect to the local surface normal vectors of the subareas 516 has a specific value, such as zero degrees. The UE 104 may set the surface phase of each subarea 516 to produce a wide beam (using virtual focal points) with a coverage area that includes the location of the UE 104, for example, by adjusting the surface phases until one or more properties of signals received at the UE 104 satisfy a threshold. In certain aspects, the lack of information on the location of the base station and/or the assumption that the base station is positioned at a specific location (e.g., straight ahead of the IRS) may result in the wide beam to have an arbitrary or unknown orientation. Due to the width of the beam, the beam coverage area may include the UE location. If RSRP measurements at the UE yield low signal quality (e.g., RSRP), other locations for the virtual focal points may be used, such as closer to the edges of the subarea rather than the center of the subarea. The UE 104 may use the phase deltas resulting from virtual focal point perturbations, for example, as depicted in FIGS. 11A and 11B, to determine the surface phase gradient (e.g., virtual AoD) of each subarea 516. Note that the lack of base station location in Expression (2), as compared to Expression (1), when forming virtual focal points for the purpose of estimating the surface phase gradient (e.g., virtual AoD) does not cause an incorrect beam orientation for the focused beam shown in FIG. 9B. This is because the operation determines the surface phase gradient used to orient the beam towards the UE as depicted in FIG. 9B.

Figure 12:
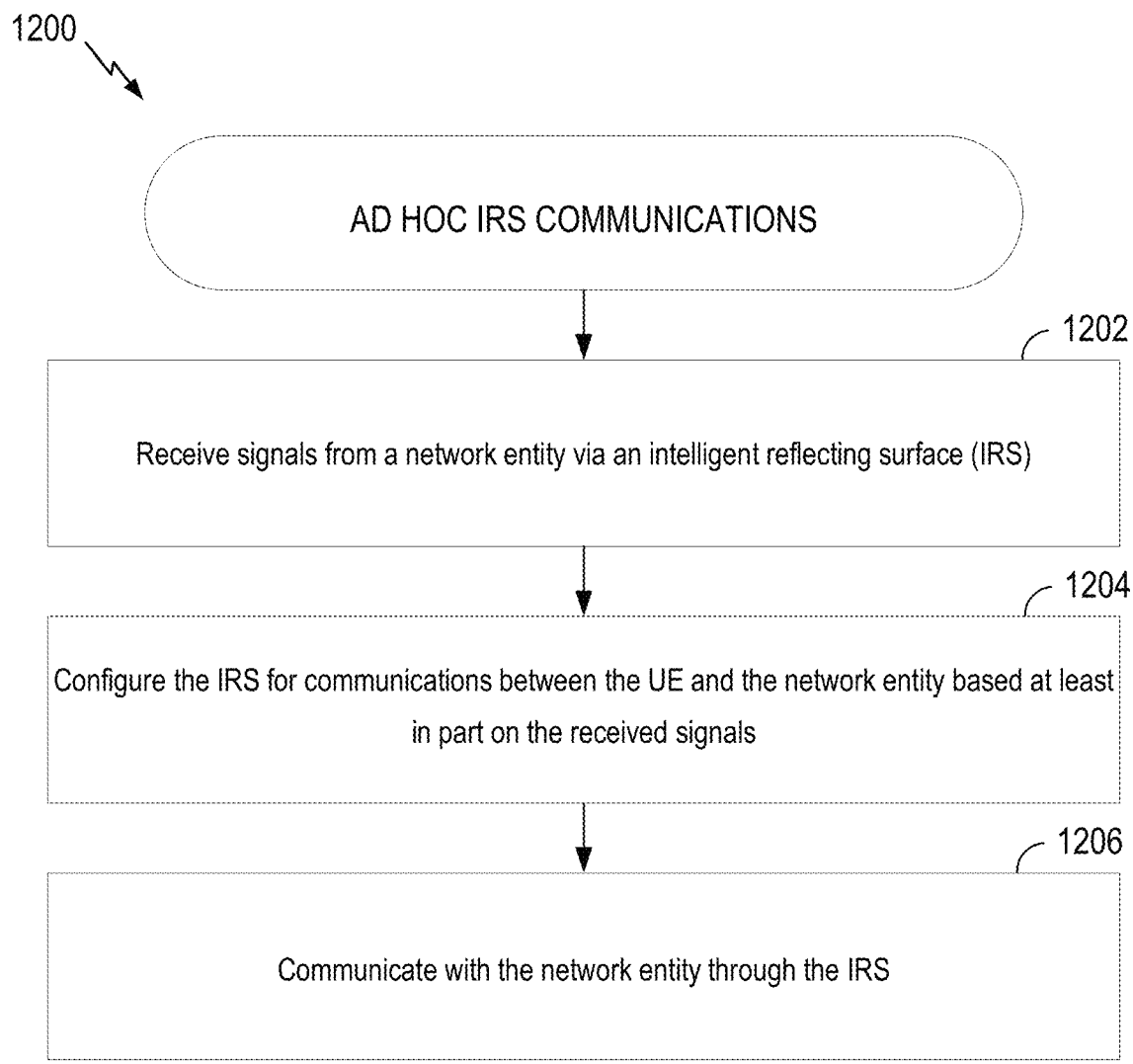
FIG. 12 is a flow diagram illustrating example operations for wireless communication, for example, by a UE.

FIG. 12 is a flow diagram illustrating example operations 1200 for wireless communication, in accordance with certain aspects of the present disclosure. The operations 1200 may be performed, for example, by a UE (such as the UE 104a in the wireless communication network 500). The operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may optionally begin, at block 1202, where the UE may receive signals from a network entity (e.g., the BS 102 and/or NTN 520) via an ad hoc IRS (e.g., the IRS 114 and/or the wireless device 502). The signals may include data signals and/or control signals. The signals may include periodic reference signals, semi-persistent reference signals, and/or aperiodic reference signals. For example, the UE may receive reference signals from the network entity, where the reference signals may be transmitted periodically by the network entity. The reference signals may include an SSB and/or CSI-RS, for example. As used herein, a network entity may refer to a wireless communication device in a radio access network, such as a base station, a remote radio head or antenna panel in communication with a base station, and/or network controller.

At block 1204, the UE may configure the IRS for communications between the UE and the network entity based at least in part on the received signals. The UE may configure the IRS with beamforming information indicating a direction for a radiation (or reflection pattern). The beamforming information may include a number of subareas of the IRS, a size of each of the subareas, a beamforming surface phase associated with each of the subareas, a co-phasing coefficient associated with each of the subareas, interpolation information for beamforming across the subareas, or any combination thereof. The UE may configure the IRS with beamforming information or parameters that indicate to focus or defocus the radiation pattern of reflected signals on the UE, for example, as depicted in FIGS. 8A and 8B, respectively. In certain cases, the UE may re-configure the IRS periodically (e.g., every 5 minutes, 10 minutes, etc.) or in response to a certain event. The UE may re-configure the IRS in response to a change in position of the UE relative to the IRS, for example, if the UE and/or the IRS is moved. The UE may re-configure the IRS in response to a change in signal quality from the network entity, for example, if an RSRP is less than or equal to a threshold.

At block 1206, the UE may communicate with the network entity through the IRS. The UE communicating with the network entity may involve the UE transmitting and/or receiving. In some cases, the UE may receive reflected signals from the network entity via the IRS, for example, as described herein with respect to FIG. 5. The UE may transmit signals to the network via the IRS, for example, as described herein with respect to FIG. 5.

To configure the number of the subareas and the size of each of the subareas, the UE may configure an initial number of the subareas and an initial size of each of the subareas based on expected characteristics of the IRS and/or an expected received signal power (e.g., RSRP) from each of the subareas. The expected characteristics of the IRS may include characteristics associated with the surface of the IRS, such as expected region(s) of the IRS where the surface is flat or where there are creases due to folding, for example. In certain cases, the UE may arrange the borders of subareas along creases due to the folding of the IRS.

To configure the number of the subareas and the size of each of the subareas, the UE may perform multiple iterations of segmentation. For example, the UE may segment one or more of the subareas or merge two or more of the subareas based on beamforming directions associated with the subareas and one or more received signal properties associated with the subareas. The UE may segment subareas or merge subareas based on a comparison of the beamforming directions associated with the subareas and/or received signal properties associated with the subareas. For example, the UE may merge two subareas with similar RSRPs (e.g., a difference of RSRPs within a threshold). In certain cases, the UE may merge two subareas with similar beamforming directions (e.g., a difference of AoDs within a threshold).

To configure the beamforming surface phase, the UE may configure, for each of the subareas, the beamforming surface phase based at least in part on a focal point or a virtual focal point associated with the respective subarea, for example, as depicted in FIGS. 8A and 8B. For example, the UE may determine a virtual focal point and/or focal point for each of the subareas and determine the corresponding beamforming surface phases based on the virtual focal points and/or focal points.

To configure the beamforming surface phase based at least in part on the virtual focal point, the UE may configure, for each of the subareas, the beamforming surface phase based on an assumption of a location of the network entity and one or more reflection coefficients associated with respective subarea. For example, the UE may determine the beamforming surface phase for each of the subareas based on Expression (2), which relies on the assumption of the location of the network entity. The UE may determine a received signal power (e.g., RSRP) for each of the subareas using a channel estimation associated with each of the subareas. The UE may measure the RSRP of the signals received at block 1202 for each of the subareas using a channel estimation associated with the respective subarea. The UE may adjust a location of the virtual focal point associated with one of the subareas if the corresponding received signal power does not satisfy a threshold (e.g., if the RSRP is less than a threshold).

To configure the beamforming surface phase based at least in part on the focal point, the UE may determining, for each of the subareas, a radial distance from the respective subarea to the focal point. The UE may configure, for each of the subareas, the beamforming surface phase based on the determined radial distance such that a reflected beam is oriented in a first direction from the respective subarea towards the UE.

To configure the beamforming surface phase, the UE may determine, for each of the subareas, a surface phase gradient to orient reflected signals from the respective subarea towards the UE. The surface phase gradient may include a second direction tangential to the respective subarea and a rate of change of the beamforming surface phase along the direction.

To determine the surface phase gradient, the UE may configure, for each of the subareas, a first virtual focal point (e.g., a virtual focal point centered in a subarea) to be used in a first time interval, a second virtual focal point (e.g., a virtual focal point moved by dx) to be used in second time interval, and a third virtual focal point (e.g., a virtual focal point moved by dy) to be used in a third time interval.

Each of virtual focal points may be positioned on a plane parallel to and behind the corresponding subarea. Each of the second and third virtual focal points may be located within a half wavelength from the first virtual focal point and may be in linearly independent directions (e.g., dx or dy) with respect to the corresponding first virtual focal point. The UE may measure a channel corresponding to each of the first virtual focal points, the second virtual focal points, and the third virtual focal points in the corresponding first time interval, second time interval, and the third time interval. For example, the UE may receive signals at block 1202 and measure the channels associated with the virtual focal points of the subareas.

The UE may determine the phase changes associated with the second and third virtual focal points relative to the first virtual focal points. The UE may determine, for each of the second virtual focal points associated with the subareas, a first phase change in a first signal received at the UE corresponding to the second virtual focal point compared to a phase of a second signal received at the UE corresponding to the first virtual focal point, based on the measured channels. The UE may determine, for each of the third virtual focal points associated with the subareas, a second phase change in a third signal received at the UE corresponding to the third virtual focal point compared to the phase of the second signal received at the UE corresponding to the first virtual focal point, based on the measured channels. The UE may map, for each of the subareas, at least one of the first phase changes and the second phase changes to the surface phase gradient associated with the respective subarea. The surface phase gradient associated with the respective subarea may correspond to a virtual angle-of-departure associated with the respective subarea. To determine the surface phase gradient, the UE may filter and/or interpolate the surface phase gradient for each of the subareas. For example, the surface phase gradient for a particular subarea may be the average surface phase gradient among the subarea and other subareas adjacent to the subarea.

To configure the beamforming surface phase, the UE may configure, for each of the subareas, the beamforming surface phase of the IRS and the radial distance associated with the focal point based on the corresponding virtual angle-of-departure. The radial distance may be configured to a value that is larger than an estimated distance between the IRS and the UE, indicative of infinity (or a substantially large distance, such as one or two kilometers), or negative (e.g., a radial distance associated with a virtual focal point).

To configuring the co-phasing coefficient, the UE may determine, for each of the subareas, a channel estimation based on the received signals, and the UE may determine, for each of the subareas, the co-phasing coefficient based on the channel estimation. The UE may determine, for each of the subareas, the co-phasing coefficient as a sum of an inverse of a phase associated with the channel estimation for the respective subarea and the beamforming surface phase for the respective subarea. To determine the co-phasing coefficient, the UE may add a negative of the phase of the estimated channel coefficient associated with a subarea to the beamforming surface phase of the subarea.

In certain aspects, the UE may determine beamforming information associated with the IRS based on the received signals. In certain cases, the UE may adjust the beamforming performed at the IRS 114 until one or more properties of signals (e.g., RSRP) received at the UE 104a satisfy a threshold. With the adjusted beamforming, the UE may determine a beam radiation (reflection) pattern for the IRS to use in reflecting signals to the UE and/or the network entity. In some cases, the UE may configure the IRS to beamform or focus reflections toward the UE for signals from the network entity based on the determined beamforming information. The UE may configure the IRS to beamform or focus reflections toward the network entity for signals from the UE based on the determined beamforming information. For example, the UE may determine co-phasing terms (e.g., beamforming weights and/or phase shifts for reflection elements) associated with the IRS for beamforming a radiation pattern towards the UE, and the UE may configure the IRS with the co-phasing terms. The co-phasing terms may include a co-phasing term associated with each of the subareas of the IRS.

The surface phases of the IRS for reflecting signals from the UE may be different than (or separate from) the surface phases of the IRS for reflecting signals from the network entity. The downlink/uplink surface phases may differ due to different wavelengths or other factors. The UE may configure the IRS with separate beamforming information or parameters for reflecting signals from the UE and for reflecting signals from the network entity. For example, the UE may indicate the wavelength or frequency of transmissions to be reflected, and the controller of the IRS may determine the surface phase for uplink and/or downlink transmissions using the wavelength corresponding to a resource allocation, given the beamforming information such as azimuth and elevation per subarea.

For certain aspects, the UE may divide the surface (or reflection elements) of the IRS into N subareas and determine the orientation of the UE from each of the subareas. To determine the beamforming information associated with the IRS, the UE may configure the IRS to activate each of the subareas one at a time and/or activate each of the subareas at the same time, for example, using an orthogonal cover as described herein with respect to FIGS. 9 and 10, and the UE may measure the phase and/or power of the reflected reference signals. The phase and/or power of the reference signals measured at the UE may be indicative of the orientation of the radiation pattern from the IRS and/or the distance of the UE from the IRS.

The beamforming information associated with the IRS may include subarea segmentation information (e.g., a number of subareas and/or size of each subarea), virtual focal point or a real focal point per subarea, virtual AoD per subarea, radial distance of the (virtual) focal point(s), and/or co-phasing coefficients. The beamforming information may include an orientation (or direction) of the UE and/or network entity relative to the IRS. The orientation may be indicated as a location of the UE/network entity, an azimuthal direction of the UE/network entity, and/or an elevation direction of the UE/network entity. The beamforming information may include a radial distance between the UE (or network entity) and a focal point (e.g., the focal point 802) for each subarea of the IRS. The beamforming information may include a location of the focal point, for example, in terms of a radial distance from the IRS, an azimuth, and an elevation. The beamforming information may include an azimuth of a radiation pattern for the IRS and/or an elevation of the radiation pattern for the IRS. For example, the radiation pattern may be focused on a wireless device, for example, as depicted in FIG. 8B. The beamforming information may include one or more co-phasing terms associated with the IRS. The co-phasing terms may include beamforming weights and/or phase shifts for reflection elements of the IRS.

The beamforming information may include a first number of subareas (e.g., the subareas 516) of the IRS and/or a second number of reflection elements in each of the subareas. In certain aspects, the method of partitioning the IRS into subareas may be configurable at the IRS and indicated by the UE. The beamforming information may be subarea specific or common to the subareas of the IRS. For example, the beamforming information may include a set of properties, where each property (e.g., a phase shift for co-phasing) in the set of properties is specific to a different subarea of the subareas of the IRS. For certain aspects, the beamforming information may include any combination of the properties or parameters associated with the IRS.

In certain aspects, the UE may determine the beamforming information based on instantaneous measurements and/or time-averaged measurements. The UE may obtain a time series of measurements on the received signals. For example, the UE may measure the phase shifts of the received signals for each of the subareas of the IRS over a certain duration (e.g., 500 milliseconds, 5 seconds, 10 seconds, etc.). The UE may filter or average the time series of measurements to determine a filtered or time-averaged value for the measurements. The UE may determine the beamforming information associated with the IRS based on the filtered/time-averaged measurements. For example, the UE may determine whether one or more properties of a received signal satisfy a threshold based on time-averaged measurements of the received signal.

For certain aspects, to reconfigure the IRS, the UE may detect the change in position of the UE based at least in part on a change in surface phase gradients of one or more subareas being larger than (e.g., greater than) a threshold; a change in virtual angles of departure of one or more subareas being larger than a threshold; a change in RSRP for one or more subareas being larger than a threshold; a change in co-phasing coefficients for one or more subareas being larger than a threshold; or any combination thereof. For example, the UE may reconfigure the IRS in response to detecting a change in position of the UE based at least in part on a change in virtual angles-of-departure associated with subareas of the IRS being larger than (e.g., greater than) a threshold.

For certain aspects, the UE may share the usage of the IRS with other wireless communications devices (e.g., the UE 104b in FIG. 5). The UE may receive, from the network entity, scheduling indicating time resources for using the IRS to communicate with the network entity, and the UE may communicate with the network entity through the IRS based on the scheduling. In some cases, the UE may transmit, to the network entity, an indication that a plurality of UEs are using the IRS and an identifier associated with the IRS. The UE may receive scheduling that indicates the UE is allowed to use the IRS for communications with the network entity. In certain cases, the UE may indicate to the network entity that the UE and other UEs are (or will be) using the IRS for communications. The UE may provide an identifier of the IRS to the network entity. The identifier of the IRS may include a unique identification associated with the IRS, such as a cell identifier associated with the IRS. The scheduling from the network entity may indicate the UE can use the IRS for communications. Such an indication may be provided as a TCI state associated with the IRS. The scheduling from the network entity may indicate that the UE is not allowed (or cannot) use the IRS for communications. Such an indication may be provided as a TCI state, for example. The TCI state indicating the UE can use the IRS may be different from the TCI state indicating that the UE is not allowed to use the IRS.

Figure 13:
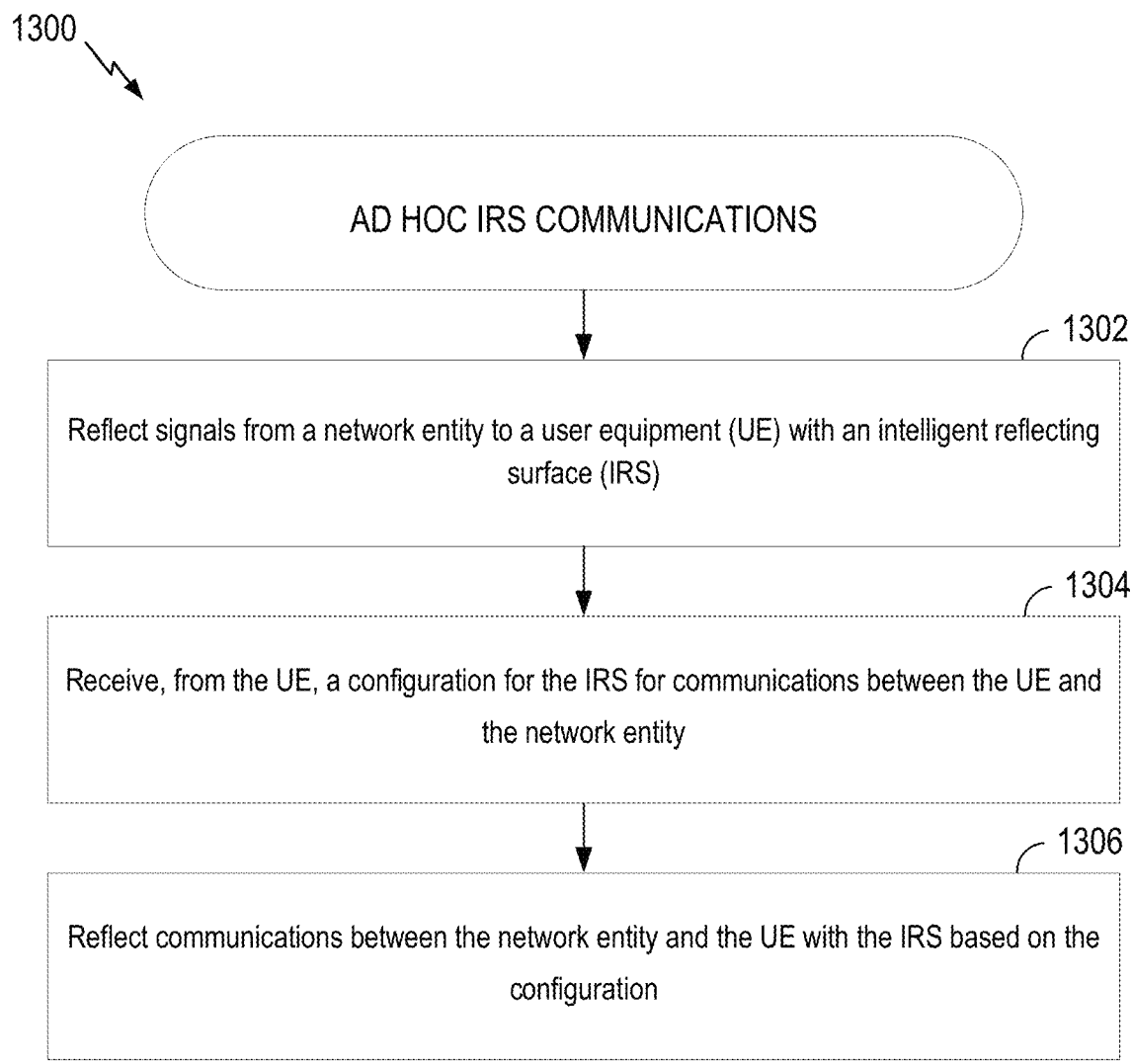
FIG. 13 is a flow diagram illustrating example operations for wireless communication, for example, by an IRS controller.

FIG. 13 is a flow diagram illustrating example operations 1300 for wireless communication, in accordance with certain aspects of the present disclosure. The operations 1300 may be performed, for example, by a wireless device (such as the wireless device 502 in the wireless communication network 500). The operations 1300 may be complementary to the operations 1200 performed by the UE. The operations 1300 may be implemented as software components that are executed and run on one or more processors (e.g., controller 216 of FIG. 5). Further, the transmission and reception of signals by the network entity in operations 1300 may be enabled, for example, by one or more antennas (e.g., antennas 506 of FIG. 5). In certain aspects, the transmission and/or reception of signals by the network entity may be implemented via a bus interface of one or more processors (e.g., controller 216) obtaining and/or outputting signals.

The operations 1300 may optionally begin, at block 1302, where the wireless device may reflect signals from a network entity (e.g., the BS 102 and/or the NTN 520 of FIG. 5) to a UE (e.g., the UE 104a of FIG. 5) with an ad hoc IRS (e.g., the IRS 114 of FIG. 5). For example, the IRS may activate subareas of the IRS one at a time and/or at the same time, as described herein with respect to FIGS. 9 and 10. The signals may include an SSB and/or CSI-RS, for example.

At block 1304, the wireless device may receive, from the UE, a configuration associated with communications between the UE and the network entity via the IRS. The configuration may indicate beamforming information associated with the IRS, for example, as described herein with respect to the operations 1200. The configuration may identify beamforming information indicating a direction for a radiation (or reflection pattern). The beamforming information may include a number of subareas of the IRS, a size of each of the subareas, a beamforming surface phase associated with each of the subareas, a co-phasing coefficient associated with each of the subareas, interpolation information for beamforming across the subareas, or any combination thereof.

At block 1206, the wireless device may reflect communications between the network entity and the UE with the IRS based on the configuration. In some cases, the wireless device may reflect signals from the network entity to the UE via the IRS, for example, as described herein with respect to FIG. 5. The wireless device may reflect signals from the UE to the network via the IRS, for example, as described herein with respect to FIG. 5. The wireless device may focus or defocus reflections toward the UE for signals from the network entity based on the configuration. The wireless device may focus or defocus reflections toward the network entity for signals from the UE based on the configuration.

The configuration may further identify an initial number of the subareas and an initial size of each of the subareas based on expected characteristics of the IRS (e.g., arrangements of flat areas or creases across the surface of the IRS), an expected received signal power (e.g., RSRP) from each of the subareas, or any combination thereof. The configuration may further identify a segmentation of one or more of the subareas or a merger of two or more of the subareas, for example as described herein with respect to the operations 1200. The configuration may further identify, for each of the subareas, the beamforming surface phase based at least in part on a focal point or a virtual focal point associated with the respective subarea.

In certain aspects, the wireless device may receive a first configuration that identifies, for each of the subareas, the beamforming surface phase based on an assumption of a location of the network entity (e.g., Expression (2)) and one or more reflection coefficients associated with respective subarea. The wireless device may reflect signals from the network entity to the UE based on the first configuration. The wireless device may receive a second configuration that identifies adjusted location(s) of virtual focal point(s) or focal point(s) associated with at least one of the subareas.

For certain aspects, the configuration may further identify, for each of the subareas, the beamforming surface phase such that a reflected beam from the IRS is oriented in a first direction from the respective subarea towards the UE. The configuration may further identify, for each of the subareas, a surface phase gradient to orient reflected signals from the respective subarea towards the UE. The surface phase gradient comprises a second direction tangential to the respective subarea and a rate of change of the beamforming surface phase along the direction.

The configuration may further identify, for each of the subareas, a first virtual focal point to be used in a first time interval, a second virtual focal point to be used in second time interval, and a third virtual focal point to be used in a third time interval, for example, as described herein with respect to the operations 1200. The configuration may further identify a mapping, for each of the subareas, at least one of first phase changes associated with the second virtual focal points and second phase changes associated with the third virtual focal points to the surface phase gradient associated with the respective subarea.

The configuration may further identify, for each of the subareas, the beamforming surface phase of the IRS and a radial distance associated with the focal point based on the corresponding virtual angle-of-departure. The configuration may further identify a value associated with the radial distance that is larger than an estimated distance between the IRS and the UE, indicative of infinity, or negative (e.g., a radial distance associated with a virtual focal point).

The beamforming information associated with the IRS may include subarea segmentation information (e.g., a number of subareas and/or size of each subarea), virtual focal point or a real focal point per subarea, virtual AoD per subarea, radial distance of the (virtual) focal point(s), and/or co-phasing coefficients. The beamforming information may include an orientation of the UE (or network entity) relative to the IRS; a radial distance between the UE (or network entity) and a focal point for the IRS; a location of the focal point; an azimuth of a radiation pattern for the IRS; an elevation of the radiation pattern for the IRS; one or more co-phasing terms associated with the IRS; a first number of subareas of the IRS; a second number of reflection elements in each of the subareas; or any combination thereof. The beamforming information may be subarea specific or common to the subareas of the IRS. For example, the beamforming information may include a set of properties, where each property (e.g., a phase shift for co-phasing) in the set of properties is specific to a different subarea of the subareas of the IRS. The co-phasing terms may include a co-phasing term associated with each of a plurality of subareas of the IRS. The wireless device may receive beamforming information or parameters that indicate to focus or defocus the radiation pattern of reflected signals on the UE, for example, as depicted in FIGS. 8A and 8B, respectively. In certain cases, the UE may re-configure the IRS periodically or in response to a certain event. For example, the wireless device may receive, from the UE, an updated configuration for communications between the UE and the network entity.

While the examples depicted in FIGS. 1-13 are described herein with respect to 5G NR systems to facilitate understanding, aspects of the present disclosure may also be applied to other radio access technologies (e.g., IEEE 802.11 and/or Bluetooth). It will also be appreciated that the examples depicted in FIGS. 1-13 described herein with respect to the ad hoc IRS reflecting communications between a UE and a network entity (e.g., a base station and/or NTN) are described to facilitate understanding of aspects of the present disclosure. The ad hoc IRS may be used to reflect communications between wireless communication devices, such as between multiple UEs, between multiple base stations, between multiple access points, and/or between multiple wireless stations.

Example Wireless Communication Devices

Figure 14:
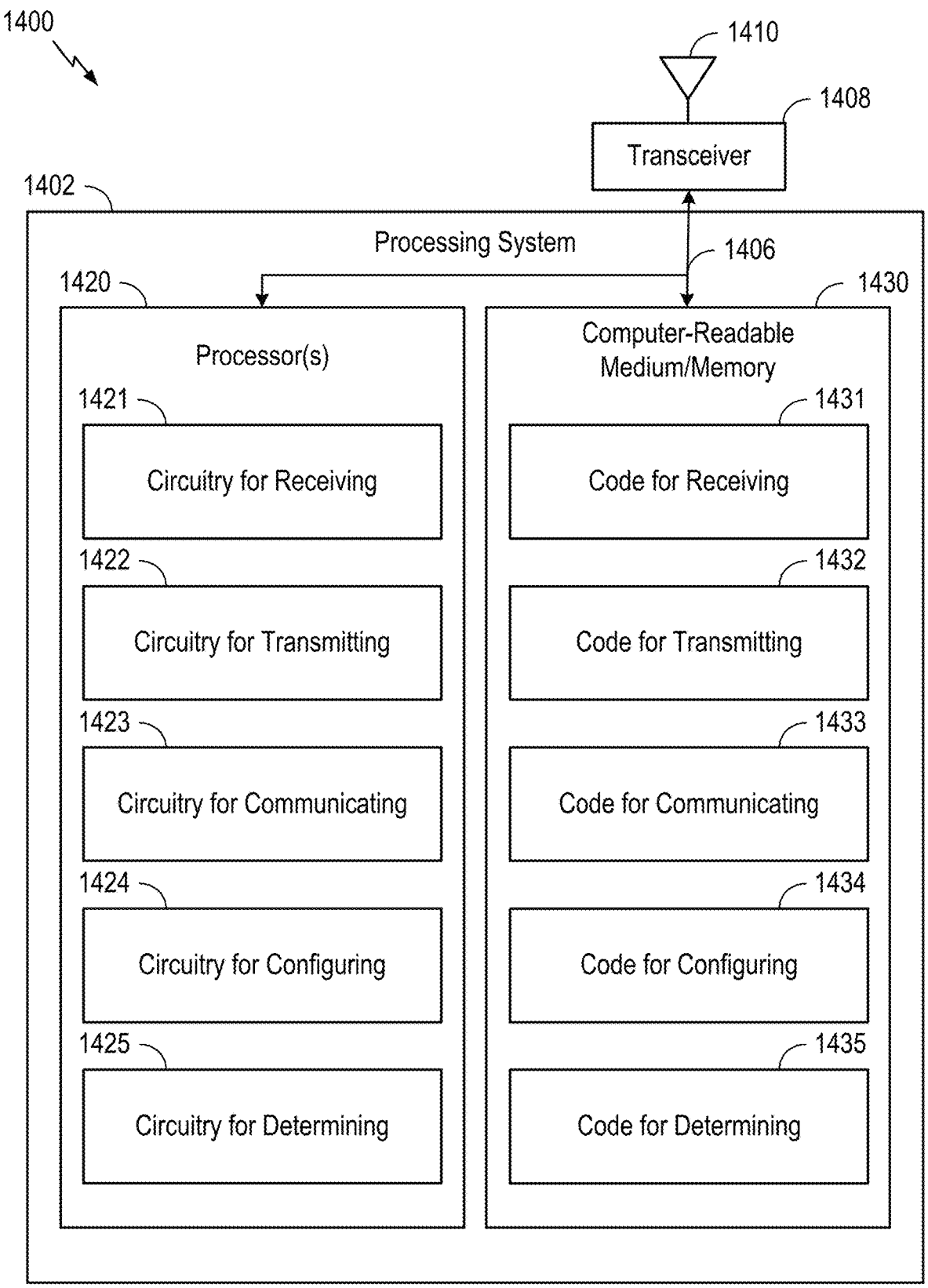
FIG. 14 depicts aspects of an example communications device.

FIG. 14 depicts an example communications device 1400 that includes various components operable, configured, or adapted to perform operations for the techniques disclosed herein, such as the operations depicted and described with respect to FIGS. 5-11. In some examples, communication device 1400 may be a UE 104 as described, for example with respect to FIGS. 1 and 2.

Communications device 1400 includes a processing system 1402 coupled to a transceiver 148 (e.g., a transmitter and/or a receiver). Transceiver 148 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 146. In certain aspects, computer-readable medium/memory 1430 is configured to store instructions (e.g., computer-executable code) that when executed by the one or more processors 1420, cause the one or more processors 1420 to perform the operations illustrated in FIGS. 5-12, or other operations for performing the various techniques discussed herein for ad hoc IRS communications.

In the depicted example, computer-readable medium/memory 1430 stores code 1431 for receiving, code 1432 for transmitting, code 1433 for communicating, code 1434 for configuring, and/or code 1435 for determining.

In the depicted example, the one or more processors 1420 include circuitry configured to implement the code stored in the computer-readable medium/memory 1430, including circuitry 1421 for receiving, circuitry 1422 for transmitting, circuitry 1423 for communicating, circuitry 1424 for configuring, and/or circuitry 1425 for determining.

Various components of communications device 1400 may provide means for performing the methods described herein, including with respect to FIGS. 5-12.

In some examples, means for transmitting or sending (or means for outputting for transmission, means for communicating, or means for configuring) may include the transceivers 254 and/or antenna(s) 252 of the UE 104 illustrated in FIG. 2 and/or transceiver 148 and antenna 1410 of the communication device 1400 in FIG. 14.

In some examples, means for receiving (or means for obtaining or means for communicating) may include the transceivers 254 and/or antenna(s) 252 of the UE 104 illustrated in FIG. 2 and/or transceiver 148 and antenna 1410 of the communication device 1400 in FIG. 14.

In some examples, means for configuring and/or means for determining may include various processing system components, such as: the one or more processors 1420 in FIG. 14, or aspects of the UE 104 depicted in FIG. 2, including receive processor 258, transmit processor 264, TX MIMO processor 266, and/or controller/processor 280 (including the IRS configuration component 281).

Notably, FIG. 14 is an example, and many other examples and configurations of communication device 1400 are possible.

Figure 15:
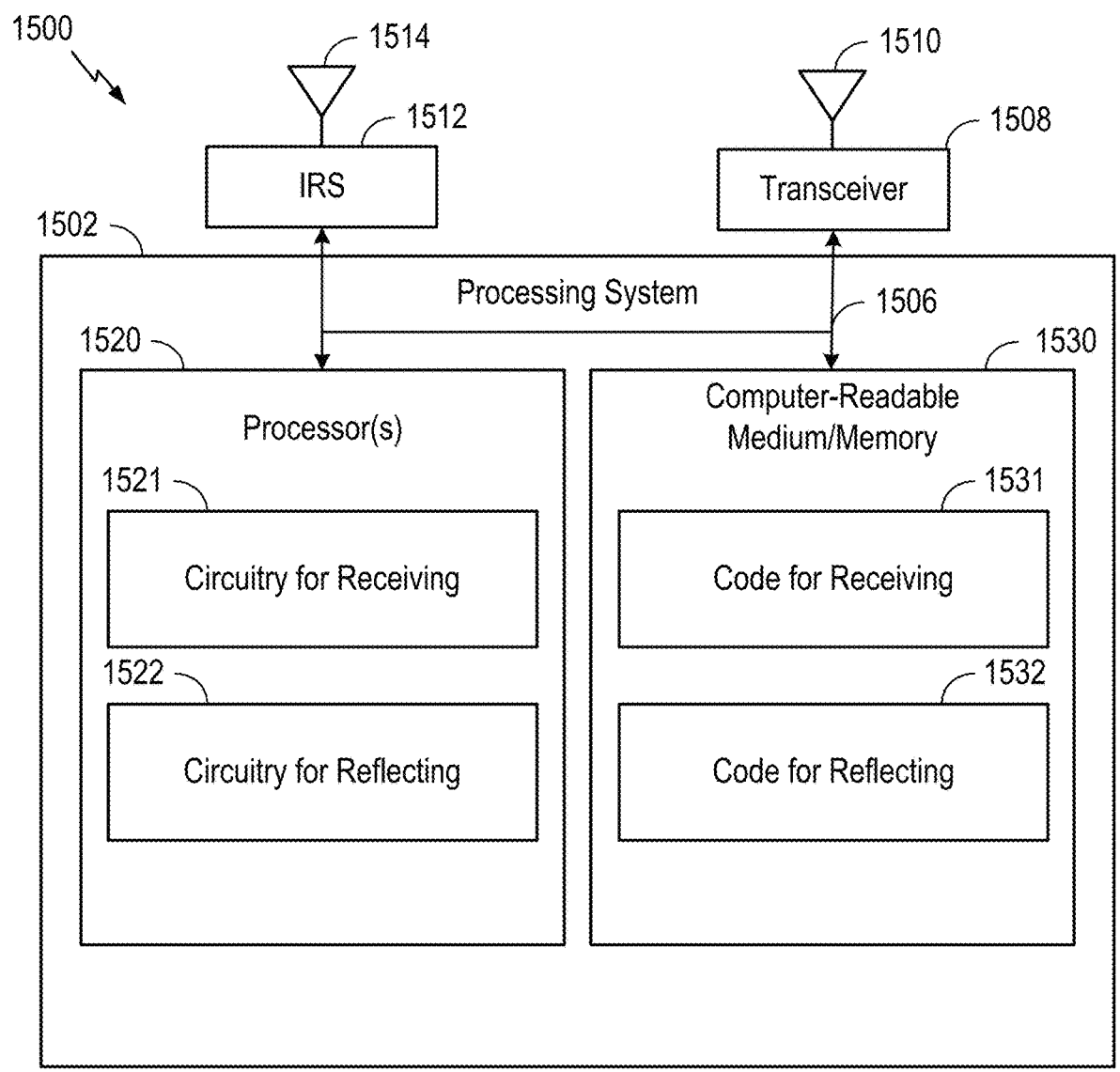
FIG. 15 depicts aspects of an example communications device.

FIG. 15 depicts an example communications device 1500 that includes various components operable, configured, or adapted to perform operations for the techniques disclosed herein, such as the operations depicted and described with respect to FIGS. 5-10B and 12. In some examples, communication device 1500 may be a wireless device 502 as described, for example with respect to FIG. 5.

Communications device 1500 includes a processing system 1502 coupled to a transceiver 1508 (e.g., a transmitter and/or a receiver) and/or an IRS 1512 (e.g., a reflectarray and/or a metasurface). Transceiver 1508 is configured to transmit (or send) and receive signals for the communications device 1500 via an antenna 1510, such as the various signals as described herein. The IRS 1512 is configured to reflect and/or re-radiate signals for the communications device 1500 via an element 1514, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIGS. 5-10B and 12, or other operations for performing the various techniques discussed herein for ad hoc IRS communications.

In the depicted example, computer-readable medium/memory 1530 stores code 1531 for receiving and/or code 1532 for reflecting (or refracting or re-radiating).

In the depicted example, the one or more processors 1520 include circuitry configured to implement the code stored in the computer-readable medium/memory 1530, including circuitry 1521 for receiving and/or circuitry 1522 for reflecting (or refracting or re-radiating).

Various components of communications device 1500 may provide means for performing the methods described herein, including with respect to FIGS. 5-10B and 12.

In some examples, means for receiving (or means for obtaining) may include the transceiver 504 and/or antenna 506 of the wireless device illustrated in FIG. 5 and/or transceiver 1508 and antenna 1510 of the communication device 1500 in FIG. 15.

In some examples, means for reflecting (or means for refracting or means for re-radiating) may include the IRS 114 of the wireless device illustrated in FIG. 5 and/or IRS 1512 and element 1514 of the communication device 1500 in FIG. 15.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for reflecting may include various processing system components, such as: the one or more processors 1520 in FIG. 15, or aspects of the wireless device 502 depicted in FIG. 5, including controller 216 (including the IRS configuration component 218).

Notably, FIG. 15 is an example, and many other examples and configurations of communication device 1500 are possible.

EXAMPLE ASPECTS

Implementation examples are described in the following numbered clauses:

Aspect 1: A user equipment (UE) for wireless communication, comprising: a memory; a processor coupled to the memory, the processor being configured to: receive signals from a network entity via an ad hoc intelligent reflecting surface (IRS), configure the IRS for communications between the UE and the network entity based at least in part on the received signals, and communicate with the network entity through the IRS.

Aspect 2: The UE of Aspect 1, wherein the processor is further configured to: determine one or more properties associated with the IRS based at least in part on the received signals; and configure the IRS with beamforming information including: a number of subareas of the IRS, a size of each of the subareas, a beamforming surface phase associated with each of the subareas, a co-phasing coefficient associated with each of the subareas, interpolation information for beamforming across the subareas, or any combination thereof.

Aspect 3: The UE of Aspect 2, wherein to configure the number of the subareas and the size of each of the subareas, the processor is further configured to configure an initial number of the subareas and an initial size of each of the subareas based on: expected characteristics of the IRS, an expected received signal power from each of the subareas, or any combination thereof.

Aspect 4: The UE of Aspect 2 or 3, wherein to configure the beamforming surface phase, the processor is further configured to configure, for each of the subareas, the beamforming surface phase based at least in part on a focal point or a virtual focal point associated with the respective subarea.

Aspect 5: The UE of Aspect 4, wherein to configure the beamforming surface phase based at least in part on the virtual focal point, the processor is further configured to: configure, for each of the subareas, the beamforming surface phase based on an assumption of a location of the network entity and one or more reflection coefficients associated with respective subarea; determine a received signal power for each of the subareas using a channel estimation associated with each of the subareas; and adjust a location of the virtual focal point associated with one of the subareas if the corresponding received signal power does not satisfy a threshold.

Aspect 6: The UE of Aspect 4 or 5, wherein to configure the beamforming surface phase based at least in part on the focal point, the processor is further configured to: determine, for each of the subareas, a radial distance from the respective subarea to the focal point; and configure, for each of the subareas, the beamforming surface phase based on the determined radial distance such that a reflected beam is oriented in a first direction from the respective subarea towards the UE.

Aspect 7: The UE of Aspect 6, wherein to configure the beamforming surface phase, the processor is further configured to determine, for each of the subareas, a surface phase gradient to orient reflected signals from the respective subarea towards the UE, wherein the surface phase gradient comprises a second direction tangential to the respective subarea and a rate of change of the beamforming surface phase along the direction.

Aspect 8: The UE according to any of Aspects 2-7, wherein to determine the surface phase gradient, the processor is further configured to: configure, for each of the subareas, a first virtual focal point to be used in a first time interval, a second virtual focal point to be used in second time interval, and a third virtual focal point to be used in a third time interval; measure a channel corresponding to each of the first virtual focal points, the second virtual focal points, and the third virtual focal points in the corresponding first time interval, second time interval, and the third time interval; determine, for each of the second virtual focal points associated with the subareas, a first phase change in a first signal received at the UE corresponding to the second virtual focal point compared to a phase of a second signal received at the UE corresponding to the first virtual focal point, based on the measured channels; determine, for each of the third virtual focal points associated with the subareas, a second phase change in a third signal received at the UE corresponding to the third virtual focal point compared to the phase of the second signal received at the UE corresponding to the first virtual focal point, based on the measured channels; and map, for each of the subareas, at least one of the first phase changes and the second phase changes to the surface phase gradient associated with the respective subarea.

Aspect 9: The UE of Aspect 8, wherein the surface phase gradient associated with the respective subarea corresponds to a virtual angle-of-departure associated with the respective subarea.

Aspect 10: The UE of Aspect 9, wherein to configure the beamforming surface phase, the processor is further configured to: configure, for each of the subareas, the beamforming surface phase of the IRS and the radial distance associated with the focal point based on the corresponding virtual angle-of-departure.

Aspect 11: The UE according to any of Aspects 7-10, wherein to determine the surface phase gradient, the processor is further configured to filter and interpolate the surface phase gradient for each of the subareas.

Aspect 12: The UE according to any of Aspects 2-11, wherein to configure the co-phasing coefficient, the processor is further configured to: determine, for each of the subareas, a channel estimation based on the received signals; determine, for each of the subareas, the co-phasing coefficient based on the channel estimation.

Aspect 13: The UE of Aspect 12, wherein to determining the co-phasing coefficient, the processor is further configured to: determine, for each of the subareas, the co-phasing coefficient as a sum of an inverse of a phase associated with the channel estimation for the respective subarea and the beamforming surface phase for the respective subarea.

Aspect 14: The UE according to any of Aspects 1-13, wherein: the signals include periodic reference signals; and to configure the IRS, the processor is further configured to re-configure the IRS in response to a change in position of the UE relative to the IRS.

Aspect 15: The UE of Aspect 14, wherein to re-configure the IRS, the processor is further configured to detect a change in position of the UE based on a change in virtual angles-of-departure associated with subareas of the IRS being larger than a threshold.

Aspect 16: The UE according to any of Aspects 1-15, wherein the processor is further configured to: receive, from the network entity, scheduling indicating time resources for using the IRS to communicate with the network entity; and communicate with the network entity through the IRS based on the scheduling.

Aspect 17: The method of Aspect 16, wherein the processor is further configured to: transmit, to the network entity, an indication that a plurality of UEs are using the IRS and an identifier associated with the IRS; and wherein the scheduling indicates the UE is allowed to use the IRS for communications.

Aspect 18: An apparatus for wireless communication, comprising: a memory; and a processor coupled to the memory, the processor being configured to: reflect signals from a network entity to a user equipment (UE) with an ad hoc intelligent reflecting surface (IRS), receive, from the UE, a configuration associated with communications between the UE and the network entity via the IRS, and reflect communications between the network entity and the UE with the IRS based on the configuration.

Aspect 19: The apparatus of Aspect 18, wherein the configuration identifies beamforming information including: a number of subareas of the IRS, a size of each of the subareas, a beamforming surface phase associated with each of the subareas, a co-phasing coefficient associated with each of the subareas, interpolation information for beamforming across the subareas, or any combination thereof.

Aspect 20: The apparatus of Aspect 19, wherein the configuration further identifies an initial number of the subareas and an initial size of each of the subareas based on: expected characteristics of the IRS, an expected received signal power from each of the subareas, or any combination thereof.

Aspect 21: The apparatus of Aspect 19 or 20, wherein the configuration further identifies, for each of the subareas, the beamforming surface phase based at least in part on a focal point or a virtual focal point associated with the respective subarea.

Aspect 22: The apparatus of Aspect 21, wherein to receive the configuration, the processor is further configured to: receive a first configuration that identifies, for each of the subareas, the beamforming surface phase based on an assumption of a location of the network entity and one or more reflection coefficients associated with respective subarea; and receive a second configuration that identifies an adjusted location of the virtual focal point associated with one of the subareas.

Aspect 23: The apparatus of Aspect 21 or 22, wherein the configuration further identifies, for each of the subareas, the beamforming surface phase such that a reflected beam from the IRS is oriented in a first direction from the respective subarea towards the UE.

Aspect 24: The apparatus of Aspect 23, wherein the configuration further identifies, for each of the subareas, a surface phase gradient to orient reflected signals from the respective subarea towards the UE, wherein the surface phase gradient comprises a second direction tangential to the respective subarea and a rate of change of the beamforming surface phase along the direction.

Aspect 25: The apparatus of Aspect 24, wherein: the configuration further identifies, for each of the subareas, a first virtual focal point to be used in a first time interval, a second virtual focal point to be used in second time interval, and a third virtual focal point to be used in a third time interval; and the configuration further identifies a mapping, for each of the subareas, at least one of first phase changes associated with the second virtual focal points and second phase changes associated with the third virtual focal points to the surface phase gradient associated with the respective subarea.

Aspect 26: The apparatus of Aspect 25, wherein the surface phase gradient associated with the respective subarea corresponds to a virtual angle-of-departure associated with the respective subarea.

Aspect 27: The apparatus of Aspect 26, wherein the configuration further identifies, for each of the subareas, the beamforming surface phase of the IRS and a radial distance associated with the focal point based on the corresponding virtual angle-of-departure.

Aspect 28: The apparatus according to any of Aspects 18-27, wherein the signals include periodic reference signals.

Aspect 29: A method of wireless communication by a user equipment (UE), comprising: receiving signals from a network entity via an ad hoc intelligent reflecting surface (IRS); configuring the IRS for communications between the UE and the network entity based at least in part on the received signals; and communicating with the network entity through the IRS.

Aspect 30: The method of Aspect 29, further comprising: determining one or more properties associated with the IRS based at least in part on the received signals; and wherein configuring the IRS comprises configuring the IRS with beamforming information including: a number of subareas of the IRS, a size of each of the subareas, a beamforming surface phase associated with each of the subareas, a co-phasing coefficient associated with each of the subareas, interpolation information for beamforming across the subareas, or any combination thereof.

Aspect 31: The method of Aspect 30, wherein configuring the number of the subareas and the size of each of the subareas comprises configuring an initial number of the subareas and an initial size of each of the subareas based on: expected characteristics of the IRS, an expected received signal power from each of the subareas, or any combination thereof.

Aspect 32: The method of Aspect 31, wherein configuring the number of the subareas and the size of each of the subareas comprises segmenting one or more of the subareas or merging two or more of the subareas based on beamforming directions associated with the subareas and one or more received signal properties associated with the subareas.

Aspect 33: The method of Aspect 30 or 31, wherein configuring the beamforming surface phase comprises configuring, for each of the subareas, the beamforming surface phase based at least in part on a focal point or a virtual focal point associated with the respective subarea.

Aspect 34: The method of Aspect 33, wherein configuring the beamforming surface phase based at least in part on the virtual focal point comprises: configuring, for each of the subareas, the beamforming surface phase based on an assumption of a location of the network entity and one or more reflection coefficients associated with respective subarea; determining a received signal power for each of the subareas using a channel estimation associated with each of the subareas; and adjusting a location of the virtual focal point associated with one of the subareas if the corresponding received signal power does not satisfy a threshold.

Aspect 35: The method of Aspect 33 or 34, wherein configuring the beamforming surface phase based at least in part on the focal point comprises: determining, for each of the subareas, a radial distance from the respective subarea to the focal point; and configuring, for each of the subareas, the beamforming surface phase based on the determined radial distance such that a reflected beam is oriented in a first direction from the respective subarea towards the UE.

Aspect 36: The method of Aspect 35, wherein configuring the beamforming surface phase comprises determining, for each of the subareas, a surface phase gradient to orient reflected signals from the respective subarea towards the UE, wherein the surface phase gradient comprises a second direction tangential to the respective subarea and a rate of change of the beamforming surface phase along the direction.

Aspect 37: The method according to any of Aspects 30-36, wherein determining the surface phase gradient comprises: configuring, for each of the subareas, a first virtual focal point to be used in a first time interval, a second virtual focal point to be used in second time interval, and a third virtual focal point to be used in a third time interval; measuring a channel corresponding to each of the first virtual focal points, the second virtual focal points, and the third virtual focal points in the corresponding first time interval, second time interval, and the third time interval; determining, for each of the second virtual focal points associated with the subareas, a first phase change in a first signal received at the UE corresponding to the second virtual focal point compared to a phase of a second signal received at the UE corresponding to the first virtual focal point, based on the measured channels; determining, for each of the third virtual focal points associated with the subareas, a second phase change in a third signal received at the UE corresponding to the third virtual focal point compared to the phase of the second signal received at the UE corresponding to the first virtual focal point, based on the measured channels; and mapping, for each of the subareas, at least one of the first phase changes and the second phase changes to the surface phase gradient associated with the respective subarea.

Aspect 38: The method of Aspect 37, wherein the surface phase gradient associated with the respective subarea corresponds to a virtual angle-of-departure associated with the respective subarea.

Aspect 39: The method of Aspect 38, wherein configuring the beamforming surface phase comprises: configuring, for each of the subareas, the beamforming surface phase of the IRS and the radial distance associated with the focal point based on the corresponding virtual angle-of-departure.

Aspect 40: The method of Aspect 39, wherein configuring the radial distance comprises configuring the radial distance to a value that is larger than an estimated distance between the IRS and the UE, indicative of infinity, or negative.

Aspect 41: The method according to any of Aspects 36-40, wherein determining the surface phase gradient comprises filtering and interpolating the surface phase gradient for each of the subareas.

Aspect 42: The method according to any of Aspects 30-41, wherein configuring the co-phasing coefficient comprises: determining, for each of the subareas, a channel estimation based on the received signals; determining, for each of the subareas, the co-phasing coefficient based on the channel estimation.

Aspect 43: The method of Aspect 42, wherein determining the co-phasing coefficient comprises: determining, for each of the subareas, the co-phasing coefficient as a sum of an inverse of a phase associated with the channel estimation for the respective subarea and the beamforming surface phase for the respective subarea.

Aspect 44: The method according to any of Aspects 29-43, wherein the signals are periodic reference signals.

Aspect 45: The method according to any of Aspects 29-44, wherein configuring the IRS comprises re-configuring the IRS in response to a change in position of the UE relative to the IRS.

Aspect 46: The method of Aspect 45, wherein re-configuring the IRS comprises detecting a change in position of the UE based on a change in virtual angles-of-departure associated with subareas of the IRS being larger than a threshold.

Aspect 47: The method according to any of Aspects 2946, further comprising: receiving, from the network entity, scheduling indicating time resources for using the IRS to communicate with the network entity; and wherein communicating with the network entity comprises communicating with the network entity through the IRS based on the scheduling.

Aspect 48: The method of Aspect 47, further comprising: transmitting, to the network entity, an indication that a plurality of UEs are using the IRS and an identifier associated with the IRS; wherein the scheduling indicates the UE is allowed to use the IRS for communications.

Aspect 49: A method of wireless communication by a controller, comprising: reflecting signals from a network entity to a user equipment (UE) with an ad hoc intelligent reflecting surface (IRS); receiving, from the UE, a configuration associated with communications between the UE and the network entity using the IRS; and reflecting communications between the network entity and the UE with the IRS based on the configuration.

Aspect 50: The method of Aspect 49, wherein the configuration identifies beamforming information including: a number of subareas of the IRS, a size of each of the subareas, a beamforming surface phase associated with each of the subareas, a co-phasing coefficient associated with each of the subareas, interpolation information for beamforming across the subareas, or any combination thereof.

Aspect 51: The method of Aspect 50, wherein the configuration further identifies an initial number of the subareas and an initial size of each of the subareas based on: expected characteristics of the IRS, an expected received signal power from each of the subareas, or any combination thereof.

Aspect 52: The method of Aspect 50 or 51, wherein the configuration further identifies a segmentation of one or more of the subareas or a merger of two or more of the subareas.

Aspect 53: The method according to any of Aspects 50-52, wherein the configuration further identifies, for each of the subareas, the beamforming surface phase based at least in part on a focal point or a virtual focal point associated with the respective subarea.

Aspect 54: The method of Aspect 53, wherein receiving the configuration comprises: receiving a first configuration that identifies, for each of the subareas, the beamforming surface phase based on an assumption of a location of the network entity and one or more reflection coefficients associated with respective subarea; and receiving a second configuration that identifies an adjusted location of the virtual focal point associated with one of the subareas.

Aspect 55: The method of Aspect 53 or 54, wherein the configuration further identifies, for each of the subareas, the beamforming surface phase such that a reflected beam from the IRS is oriented in a first direction from the respective subarea towards the UE.

Aspect 56: The method of Aspect 55, wherein the configuration further identifies, for each of the subareas, a surface phase gradient to orient reflected signals from the respective subarea towards the UE, wherein the surface phase gradient comprises a second direction tangential to the respective subarea and a rate of change of the beamforming surface phase along the direction.

Aspect 57: The method according to any of Aspects 50-56, wherein: the configuration further identifies, for each of the subareas, a first virtual focal point to be used in a first time interval, a second virtual focal point to be used in second time interval, and a third virtual focal point to be used in a third time interval; and the configuration further identifies a mapping, for each of the subareas, at least one of first phase changes associated with the second virtual focal points and second phase changes associated with the third virtual focal points to the surface phase gradient associated with the respective subarea.

Aspect 58: The method of Aspect 57, wherein the surface phase gradient associated with the respective subarea corresponds to a virtual angle-of-departure associated with the respective subarea.

Aspect 59: The method of Aspect 58, wherein the configuration further identifies, for each of the subareas, the beamforming surface phase of the IRS and a radial distance associated with the focal point based on the corresponding virtual angle-of-departure.

Aspect 60: The method of Aspect 59, wherein the configuration further identifies a value associated with the radial distance that is larger than an estimated distance between the IRS and the UE, indicative of infinity, or negative.

Aspect 61: The method according to any of Aspects 49-60, wherein the signals are periodic reference signals.

Aspect 62: An apparatus, comprising: a memory comprising computer-executable instructions; one or more processors configured to execute the computer-executable instructions and cause the processing system to perform a method in accordance with any of Aspects 29-61.

Aspect 63: An apparatus, comprising means for performing a method in accordance with any of Aspects 29-61.

Aspect 64: A non-transitory computer-readable medium comprising computer-executable instructions that, when executed by one or more processors of a processing system, cause the processing system to perform a method in accordance with any of Aspects 29-61.

Aspect 65: A computer program product embodied on a computer-readable storage medium comprising code for performing a method in accordance with any of Aspects 29-61.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of wirelessly communicating with an intelligent reflecting surface in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. In some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:
   memory; and
   one or more processors coupled to the memory, the one or more processors, individually or collectively, being configured to:
      receive signals from a network entity via an ad hoc intelligent reflecting surface (IRS),
      determine one or more properties associated with the IRS based at least in part on the received signals,
      configure the IRS for communications between the UE and the network entity based at least in part on the received signals, wherein the IRS is configured with beamforming information including: a number of subareas of the IRS, a size of each of the subareas, a beamforming surface phase associated with each of the subareas, a co-phasing coefficient associated with each of the subareas, interpolation information for beamforming across the subareas, or any combination thereof, and communicate with the network entity through the IRS.

2. The UE of claim 1, wherein to configure the number of the subareas and the size of each of the subareas, the one or more processors are further configured to configure an initial number of the subareas and an initial size of each of the subareas based on:

expected characteristics of the IRS, an expected received signal power from each of the subareas, or any combination thereof.

3. The UE of claim 1, wherein to configure the beamforming surface phase, the one or more processors are further configured to configure, for each of the subareas, the beamforming surface phase based at least in part on a focal point or a virtual focal point associated with the respective subarea.

4. The UE of claim 3, wherein to configure the beamforming surface phase based at least in part on the virtual focal point, the one or more processors are further configured to:

configure, for each of the subareas, the beamforming surface phase based on an assumption of a location of the network entity and one or more reflection coefficients associated with respective subarea;

determine a received signal power for each of the subareas using a channel estimation associated with each of the subareas; and adjust a location of the virtual focal point associated with one of the subareas if the corresponding received signal power does not satisfy a threshold.

5. The UE of claim 3, wherein to configure the beamforming surface phase based at least in part on the focal point, the one or more processors are further configured to:

determine, for each of the subareas, a radial distance from the respective subarea to the focal point; and configure, for each of the subareas, the beamforming surface phase based on the determined radial distance such that a reflected beam is oriented in a first direction from the respective subarea towards the UE.

6. The UE of claim 5, wherein to configure the beamforming surface phase, the one or more processors are further configured to determine, for each of the subareas, a surface phase gradient to orient reflected signals from the respective subarea towards the UE, wherein the surface phase gradient comprises a second direction tangential to the respective subarea and a rate of change of the beamforming surface phase along the direction.

7. The UE of claim 6, wherein to determine the surface phase gradient, the one or more processors are further configured to:

configure, for each of the subareas, a first virtual focal point to be used in a first time interval, a second virtual focal point to be used in second time interval, and a third virtual focal point to be used in a third time interval;

measure a channel corresponding to each of the first virtual focal points, the second virtual focal points, and the third virtual focal points in the corresponding first time interval, second time interval, and the third time interval;

determine, for each of the second virtual focal points associated with the subareas, a first phase change in a first signal received at the UE corresponding to the second virtual focal point compared to a phase of a second signal received at the UE corresponding to the first virtual focal point, based on the measured channels;

determine, for each of the third virtual focal points associated with the subareas, a second phase change in a third signal received at the UE corresponding to the third virtual focal point compared to the phase of the second signal received at the UE corresponding to the first virtual focal point, based on the measured channels; and map, for each of the subareas, at least one of the first phase changes and the second phase changes to the surface phase gradient associated with the respective subarea.

8. The UE of claim 7, wherein the surface phase gradient associated with the respective subarea corresponds to a virtual angle-of-departure associated with the respective subarea.

9. The UE of claim 8, wherein to configure the beamforming surface phase, the one or more processors are further configured to:

configure, for each of the subareas, the beamforming surface phase of the IRS and the radial distance associated with the focal point based on the corresponding virtual angle-of-departure.

10. The UE of claim 6, wherein to determine the surface phase gradient, the one or more processors are further configured to filter and interpolate the surface phase gradient for each of the subareas.

11. The UE of claim 1, wherein to configure the co-phasing coefficient, the one or more processors are further configured to:

determine, for each of the subareas, a channel estimation based on the received signals; and determine, for each of the subareas, the co-phasing coefficient based on the channel estimation.

12. The UE of claim 11, wherein to determining the co-phasing coefficient, the one or more processors are further configured to:

determine, for each of the subareas, the co-phasing coefficient as a sum of an inverse of a phase associated with the channel estimation for the respective subarea and the beamforming surface phase for the respective subarea.

13. The UE of claim 1, wherein:

the signals include periodic reference signals; and to configure the IRS, the one or more processors are further configured to re-configure the IRS in response to a change in position of the UE relative to the IRS.

14. The UE of claim 13, wherein to re-configure the IRS, the one or more processors are further configured to detect a change in position of the UE based on a change in virtual angles-of-departure associated with subareas of the IRS being larger than a threshold.

15. The UE of claim 1, wherein the one or more processors are further configured to:

receive, from the network entity, scheduling indicating time resources for using the IRS to communicate with the network entity; and communicate with the network entity through the IRS based on the scheduling.

16. The UE of claim 15, wherein the one or more processors are further configured to:

transmit, to the network entity, an indication that a plurality of UEs are using the IRS and an identifier associated with the IRS; and wherein the scheduling indicates the UE is allowed to use the IRS for communications.

17. A method of wireless communication by a user equipment comprising:
- receiving signals from a network entity via an ad hoc intelligent reflecting surface (IRS);
- determining one or more properties associated with the IRS based at least in part on the received signals;
- configuring the IRS for communications between the UE and the network entity based at least in part on the received signals, wherein the IRS is configured with beamforming information including: a number of subareas of the IRS, a size of each of the subareas, a beamforming surface phase associated with each of the subareas, a co-phasing coefficient associated with each of the subareas, interpolation information for beamforming across the subareas, or any combination thereof; and
- communicating with the network entity through the IRS.

* * * * *